United States Patent
Tamura et al.

(10) Patent No.: US 8,276,017 B2
(45) Date of Patent: Sep. 25, 2012

(54) PROCESS, APPARATUS, AND PROGRAM FOR SYSTEM MANAGEMENT

(75) Inventors: Masahisa Tamura, Kawasaki (JP); Yasuo Noguchi, Kawasaki (JP); Kazutaka Ogihara, Kawasaki (JP); Yoshihiro Tsuchiya, Kawasaki (JP); Tetsutaro Maruyama, Kawasaki (JP); Riichiro Take, Kawasaki (JP); Seiji Toda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 344 days.

(21) Appl. No.: 12/403,166

(22) Filed: Mar. 12, 2009

(65) Prior Publication Data

US 2009/0177917 A1    Jul. 9, 2009

Related U.S. Application Data

(63) Continuation of application No. PCT/JP2006/319411, filed on Sep. 29, 2006.

(51) Int. Cl.
G06F 11/00 (2006.01)

(52) U.S. Cl. ........ 714/6.2; 714/6.21; 714/6.22; 714/6.1; 711/114

(58) Field of Classification Search .................. None
See application file for complete search history.

(56) References Cited

U.S. PATENT DOCUMENTS

| | | | | |
|---|---|---|---|---|
| 5,581,690 | A * | 12/1996 | Ellis et al. | 714/6.22 |
| 6,195,761 | B1 * | 2/2001 | Kedem | 714/6.23 |
| 7,085,953 | B1 | 8/2006 | Hsu et al. | |
| 2002/0083366 | A1 * | 6/2002 | Ohran | 714/13 |
| 2004/0160867 | A1 | 8/2004 | Motohashi | |
| 2005/0050381 | A1 * | 3/2005 | Maddock | 714/5 |
| 2005/0283654 | A1 * | 12/2005 | Wood et al. | 714/7 |

FOREIGN PATENT DOCUMENTS

| | | |
|---|---|---|
| JP | 07-044322 | 2/1995 |
| JP | 08-016328 | 1/1996 |
| JP | A 9-305327 | 11/1997 |
| JP | 11-224166 | 8/1999 |
| JP | A 2000-76207 | 3/2000 |
| JP | 2001-307410 | 11/2001 |
| JP | A 2004-265567 | 9/2004 |
| JP | 2005-293119 | 10/2005 |
| JP | 2005-346212 | 12/2005 |
| JP | 2006-505035 | 2/2006 |
| JP | 2006-065773 | 3/2006 |
| JP | A 2006-65773 | 3/2006 |

OTHER PUBLICATIONS

Office Action issued by the Patent Office of Japan for Japanese Application No. 2008-537325, issued on Mar. 29, 2011 (with partial English language translation).

* cited by examiner

*Primary Examiner* — Scott Baderman
*Assistant Examiner* — Jason Bryan
(74) *Attorney, Agent, or Firm* — Greer, Burns & Crain, Ltd.

(57) ABSTRACT

In a system management apparatus, a failure detection unit detects a readout failure in one of blocks constituting distributed data stored in a first RAID disk array. A request unit requests a computer to supplement one of the blocks of the distributed data stored in the first RAID disk array in which a readout failure irrecoverable by use of only the data stored in the first RAID disk array occurs, where the computer has a second RAID disk array storing a duplicate of the distributed data stored in the first RAID disk array. And an overwriting unit receives data corresponding to the one of the blocks from the computer, and overwrites the one of the blocks with the received data.

11 Claims, 25 Drawing Sheets

171a INTRA-NODE CONVERSION TABLE

| LOGICAL VOLUME | RAID DISK ARRAY |
|---|---|
| LOGICAL VOLUME A | RAID DISK ARRAY 120 |
| LOGICAL VOLUME B | RAID DISK ARRAY 110 |

FIG. 9

173a INTRA-NODE CONVERSION TABLE

| LOGICAL VOLUME | RAID DISK ARRAY |
|---|---|
| LOGICAL VOLUME A: SEGMENT15 | RAID DISK ARRAY2: SEGMENT2 |
| LOGICAL VOLUME B: SEGMENT5 | RAID DISK ARRAY1: SEGMENT1 |

FIG. 17 ion PCT/JP2006/319411, filed Sep. 29, 2006.

PROCESS, APPARATUS, AND PROGRAM FOR SYSTEM MANAGEMENT

CROSS-REFERENCE TO RELATED APPLICATIONS

This application is a continuing application, filed under 35 U.S.C. Section 111(a), of International Application PCT/JP2006/319411, filed Sep. 29, 2006.

FIELD

The embodiments discussed herein are related to a process, apparatus, and program for system management.

BACKGROUND

Recently, in order to facilitate operations of referring to a great amount of accumulated data of electronic documents, electronic mails, logs of observation data, or the like, it is considered desirable that the data be stored in a medium which is accessible at any time from the viewpoint of improvement and security of business processes.

In order to store data as above, a highly-reliable large-capacity storage device which can store data for a long time is needed. In addition, it is desirable that the storage device be relatively inexpensive. It is generally known that the RAID (Redundant Arrays of Inexpensive Disks) devices, each of which has a plurality of disks realizing a redundant structure, satisfy the above requirements. The redundant structure is a structure in preparation for an emergency. For example, in the redundant structure, a backup disk may be provided in addition to a disk which is mainly used, or a plurality of disks are provided and the used disk is switched among the plurality of disks. Further, virtual storage systems can be realized by connecting a plurality of modules having RAID devices, and are widely used.

Since the RAID devices redundantly store data, the RAID devices enable recovery of data even when a trouble occurs. However, when a trouble which goes beyond the redundancy of a RAID device occurs, data may not be recovered and is lost. Therefore, in order to further improve the reliability of a large-scale system, a hierarchic redundant structure such as a data redundant structure realized by interconnecting a plurality of RAID devices has been proposed (for example, as disclosed in Japanese Laid-open Patent Publication No. 2000-076207).

Nevertheless, when a trouble which is irrecoverable by the redundant structure in a node (module) is caused by a readout failure occurring in a RAID device, an operation for recovery of the entire RAID device is necessary according to the technique disclosed in Japanese Laid-open Patent Publication No. 2000-076207.

Further, when troubles concurrently occur in a plurality of nodes, are irrecoverable in the respective nodes, and go beyond the redundancy across the nodes, the recovery from the troubles is impossible.

SUMMARY

According to an aspect of the embodiments, a system management apparatus for recovering a storage device from a readout failure includes: a first RAID (Redundant Arrays of Inexpensive Disks) disk array in which distributed data is stored in disks, where the distributed data is constituted by blocks as unit regions of data storage; a failure detection unit which performs, for each of predetermined regions of the first RAID disk array, an operation for detecting occurrence of a readout failure in the blocks, where each of the predetermined regions contains one or more of the blocks; a request unit which requests another computer to supplement one of the blocks of the distributed data stored in the first RAID disk array in which a readout failure irrecoverable by use of only data stored in the first RAID disk array occurs, where the computer has a second RAID disk array storing a duplicate of the distributed data stored in the first RAID disk array; and an overwriting unit which receives data corresponding to the one of the blocks from the other computer, and overwrites the one of the blocks with the received data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a diagram indicating an example of an intra-node conversion table in the first embodiment;

FIG. 17 is a diagram indicating an example of an intra-node conversion table in the second embodiment;

DESCRIPTION OF EMBODIMENT(S)

Embodiments of the present invention will be explained below with reference to the accompanying drawings, wherein like reference numbers refer to like elements throughout. First, an outline of the present invention which is realized in the first to third embodiments is explained, and thereafter details of the first to third embodiments are explained.

1. Outline of Embodiments

Figure 1:
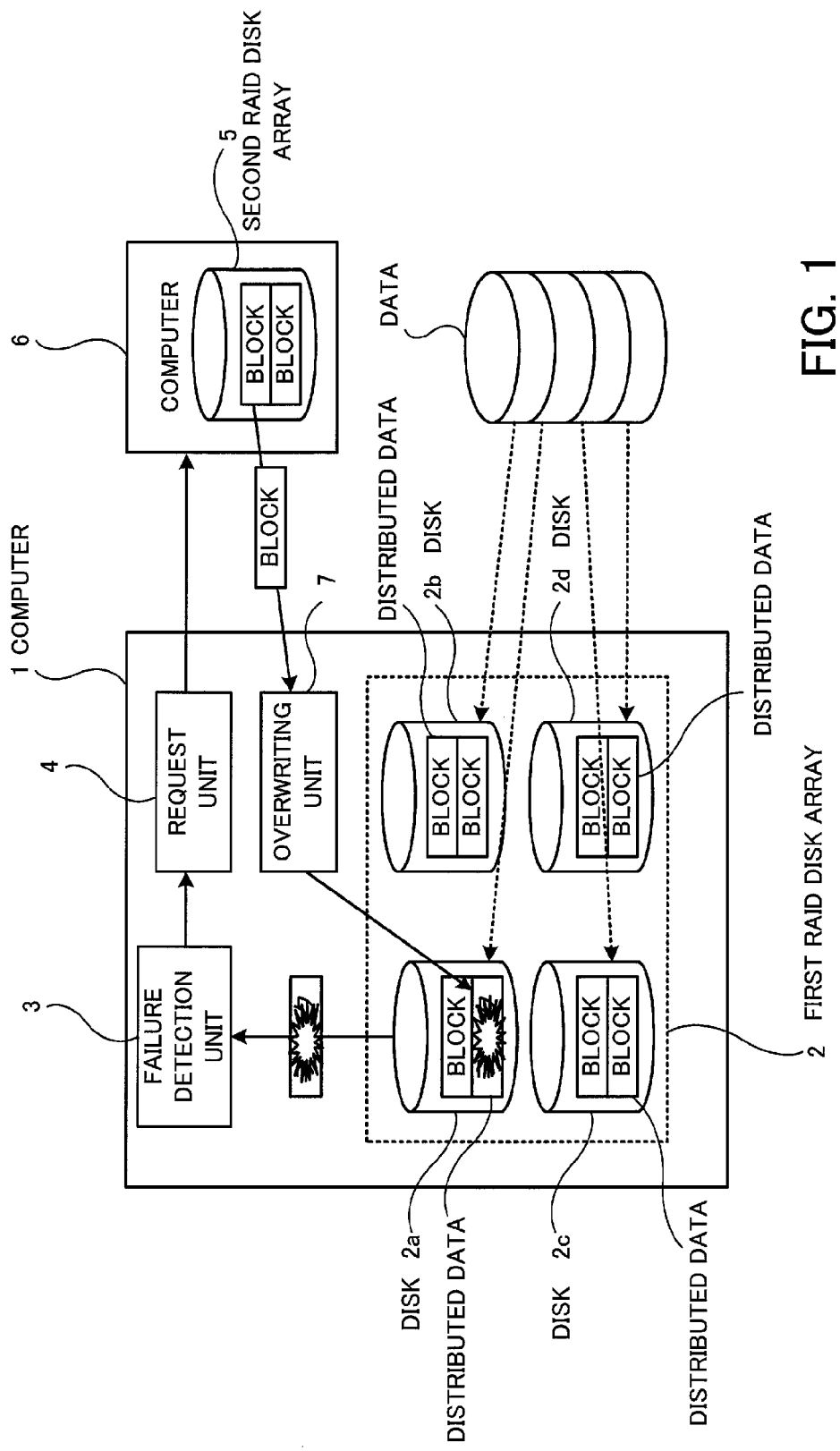
FIG. 1 is a conceptual diagram illustrating an outline of embodiments.

FIG. 1 is a conceptual diagram illustrating an outline of the embodiments. As illustrated in FIG. 1, a computer 1 is directly or indirectly connected to a computer 6. A first RAID disk array 2 stores distributed data in a plurality of disks 2a, 2b, 2c, and 2d. The distributed data is constituted by a plurality of blocks. The distributed data is a set of data which is written in a distributed manner, for example, by a server (not illustrated). A failure detection unit 3 performs, for each of predetermined regions of the first RAID disk array 2, an operation for detecting occurrence of a readout failure in the blocks, where each of the predetermined regions contains one or more of the blocks. FIG. 1 illustrates an example in which a readout failure occurs in a block in the disk 2a. When a readout failure occurs in one of the blocks, and the block is irrecoverable by use of only the data stored in the first RAID disk array 2, a request unit 4 requests the computer 6 to supplement the block. The computer 6 has a second RAID disk array 5, which stores data identical to the distributed data stored in the first RAID disk array 2. In the example illustrated in FIG. 1, the above block in the disk 2a in which the readout failure occurs is assumed to be the block which is irrecoverable by use of only the data stored in the first RAID disk array 2. In the system containing the computer 1 and the computer 6, data is redundantly stored in the first RAID disk array 2 and the second RAID disk array 5. When the computer 1 receives from the computer 6 data for a block in which a readout failure occurs, the overwriting unit 7 overwrites the block with the received data for the block.

In the above system, a system management program executed by the computer 1 realizes the above failure detection unit 3, the request unit 4, and the overwriting unit 7 on the computer 1. When the failure detection unit 3 detects a readout failure in a block (in one of the predetermined regions) in the first RAID disk array 2, and the block is irrecoverable by use of only the data stored in the first RAID disk array 2, the request unit 4 requests the computer 6 to supplement the block. Thereafter, when the computer 1 receives data for the block from the computer 6, the overwriting unit 7 overwrites the block with the received data for the block.

Hereinbelow, details of the preferred embodiments are explained.

2. First Embodiment 2.1 System Construction

Figure 2:
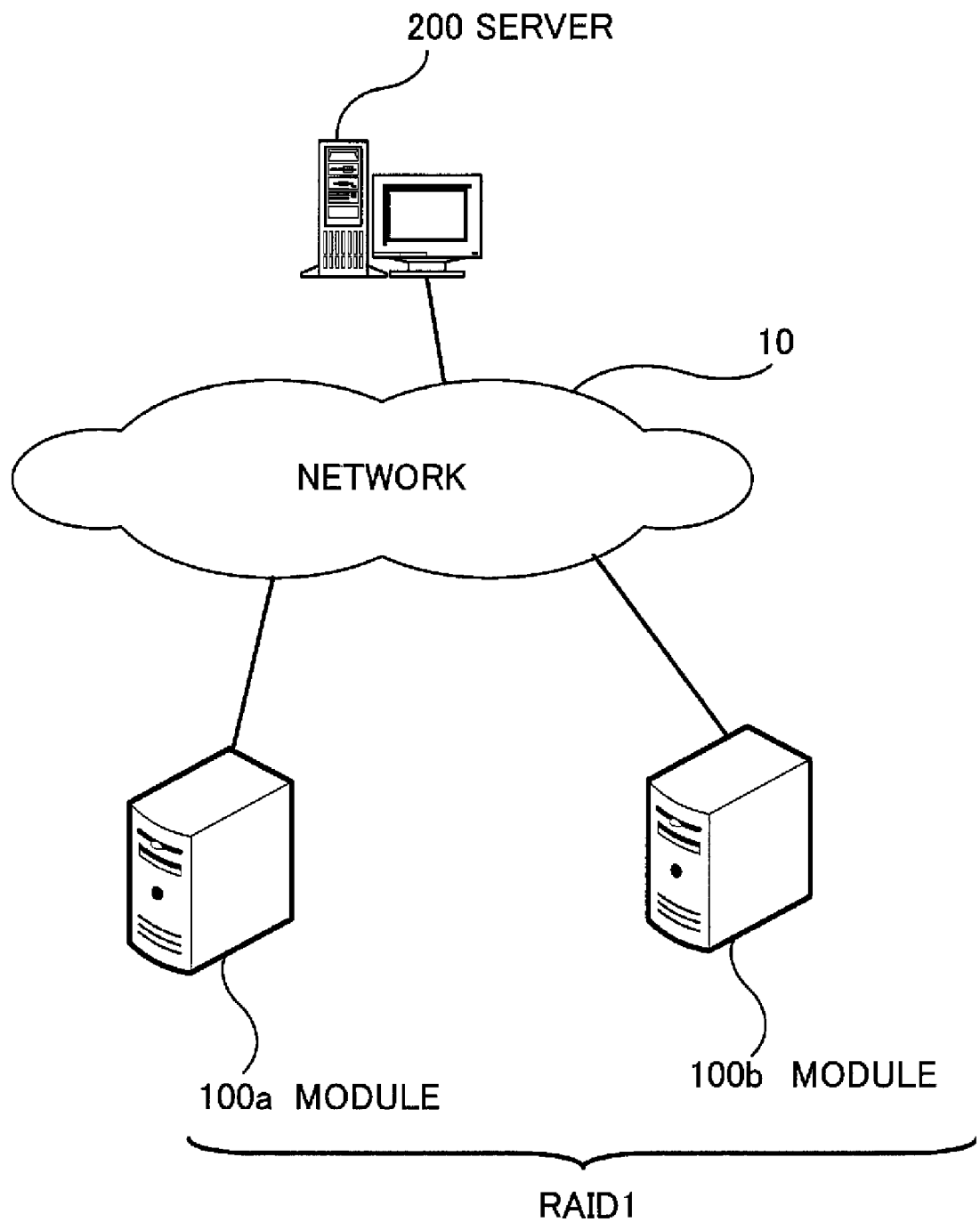
FIG. 2 is a diagram illustrating an example of a construction of a system according to a first embodiment.

FIG. 2 is a diagram illustrating an example of a construction of a system according to the first embodiment.

Each of a plurality of modules (specifically, the modules 100a and 100b in the example of FIG. 2) contains a plurality of storage devices. The modules 100a and 100b are arranged so that identical data are approximately concurrently written in the modules 100a and 100b. The data stored in one of the modules 100a and 100b are used by a server, and the data stored in the other are reserved as a backup. That is, the modules 100a and 100b constitutes a RAID (Redundant Array of Inexpensive Disks) level 1, which is hereinafter referred to as RAID#1.

In addition, when a failure occurs in a region in a storage device in one of the modules, and recovery from the failure in the module is impossible, the module accesses the other module, and recovers the data in the region.

The server 200 is connected through the network 10 to the modules 100a and 100b, and manages the operational status of each device. The server 200 approximately concurrently writes data in both the modules 100a and 100b.

2.2 Hardware Construction of Module

Figure 3:
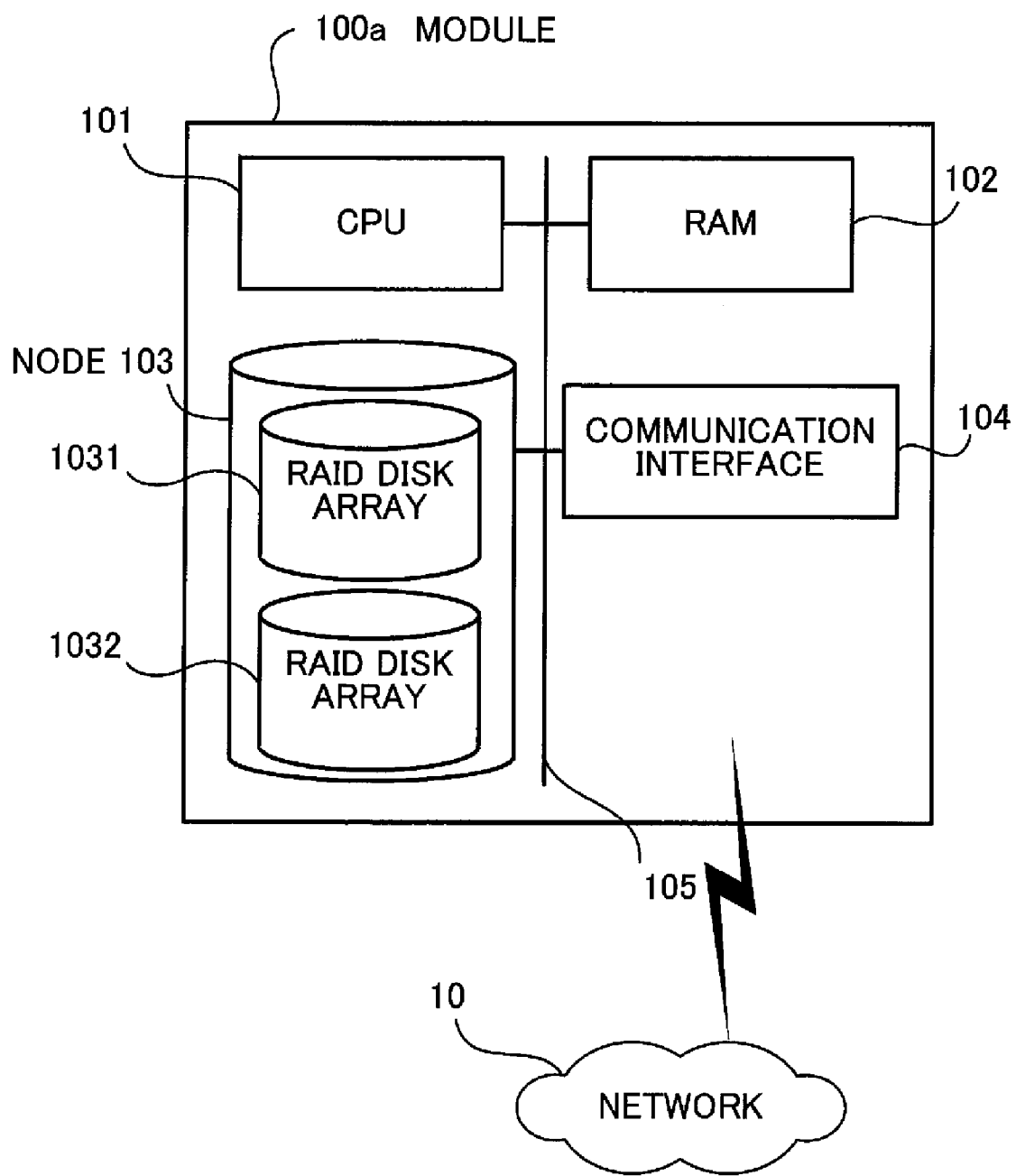
FIG. 3 is a diagram illustrating an example of a hardware construction of a module in the first embodiment.

FIG. 3 is a diagram illustrating an example of a hardware construction of a module used in the first embodiment. Although the module illustrated in FIG. 3 is the module 100a, the module 100b has a similar hardware construction.

The entire module 100a is controlled by a CPU (central processing unit) 101, to which a RAM (random access memory) 102, a node 103, and a communication interface 104 are connected through a bus 105. The RAM 102 temporarily stores at least portions of an OS (operating system) program and application programs which are executed by the CPU 101, as well as various types of data necessary for processing by the CPU 101. The node 103 has RAID disk arrays 1031 and 1032, each of which is realized by a plurality of hard disk drives (HDDs). A logical volume is assigned and managed in each of the RAID disk arrays 1031 and 1032 in the node 103. The OS program, the at least portions of application programs, and the various types of data are stored in each of the RAID disk arrays 1031 and 1032.

The communication interface 104 is connected to the network 10, so that the module 100a can exchange data with the network 10 and the server 200 and with the module 100b through the network 10 and the server 200.

2.3 Construction of Node

Figure 4:
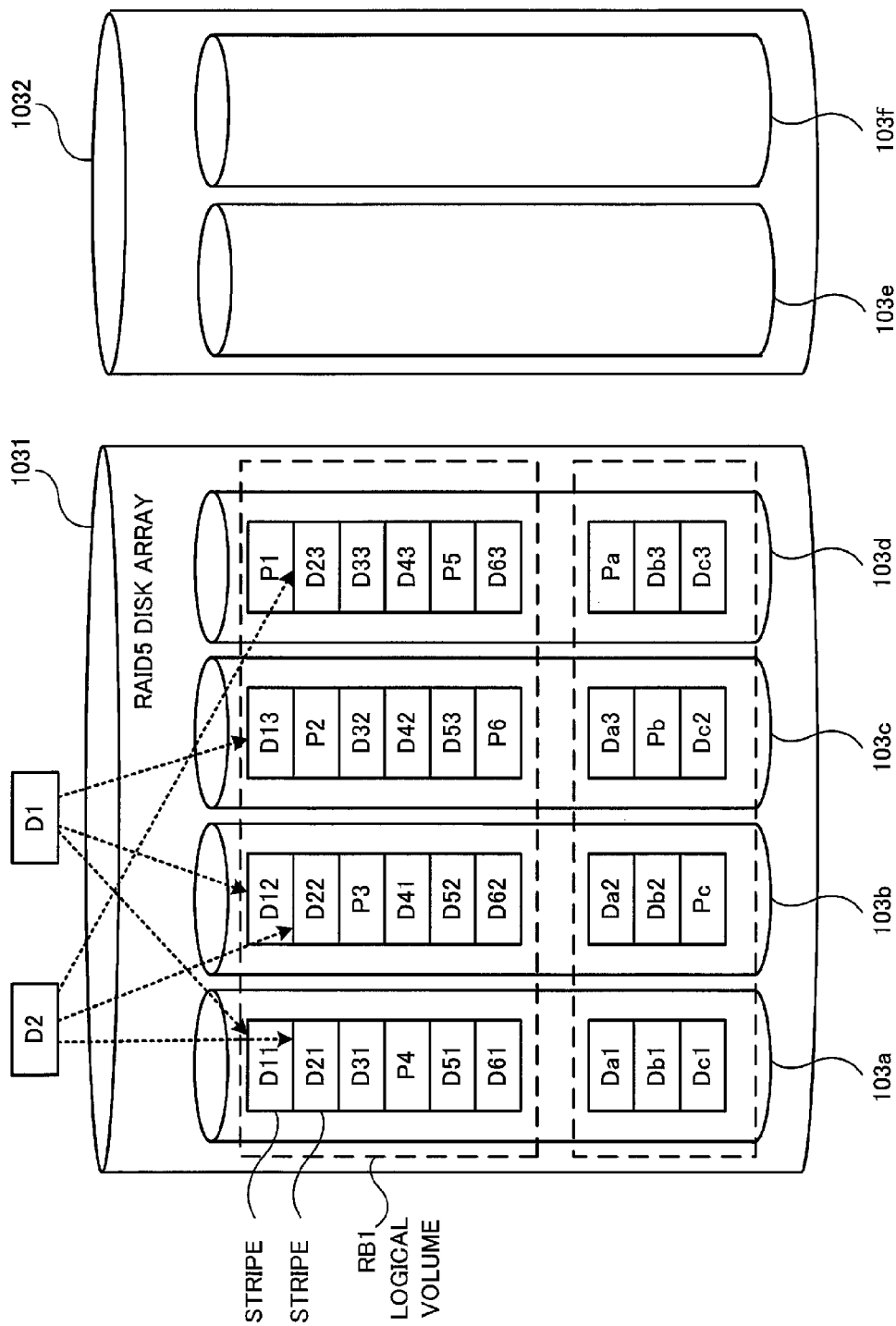
FIG. 4 is a diagram illustrating a structure of a RAID disk array in a node in the first embodiment.

The structure of the node 103 is explained below. FIG. 4 is a diagram illustrating a structure of the node 103 in each of the modules 100a and 100b in the first embodiment.

The storage capacity of the RAID disk array 1031 is, for example, approximately 1 TB (terabytes). The RAID disk array 1031 has a plurality of HDDs 103a, 103b, 103c, and 103d, which constitute a RAID level 5. (The RAID level 5 is hereinafter referred to as RAID#5.) The logical volume RB1 is realized in the 10-MB leading portions of the HDDs 103a, 103b, 103c, and 103d.

Each set of data undergoes striping, i.e., each set of data is split into portions corresponding to stripes, parity data (error correction code data) for the set of data is generated, and the stripes of the distributed data and the corresponding parity data are respectively written in the HDDs 103a, 103b, 103c, and 103d in a distributed manner. For example, a set of data D1 is split into portions D11, D12, and D13 of distributed data, parity data P1 for the set of data D1 is generated, and the stripes of the portions D11, D12, and D13 of the distributed data and the parity data P1 are separately written in the HDDs 103a, 103b, and 103c, and 103d in a distributed manner by striping. Thereafter, the next set of data D2 is split into portions D21, D22, and D23 of distributed data, and parity data P2 for the set of data D2 is generated, and the portions D21, D22, and D23 of the distributed data and the parity data P2 are separately written in the HDDs 103a, 103b, and 103d, and 103c in a distributed manner by striping. That is, the parity data P2 for the set of data D2 is written in one (the HDD 103c) of the HDDs 103a, 103b, 103c, and 103d which is different from the one (the HDD 103d) of the HDDs 103a, 103b, 103c, and 103d in which the parity data P1 for the preceding set of data D1 is written. Therefore, it is possible to prevent concentration of access in one HDD, and therefore increase the speed of the data writing operations.

As described above, the stripe is the unit of distributed data stored in each HDD (e.g., the portion D11 of the distributed data or the parity data P1), and the stripe size is, for example, 64 KB (kilobytes).

Figure 5:
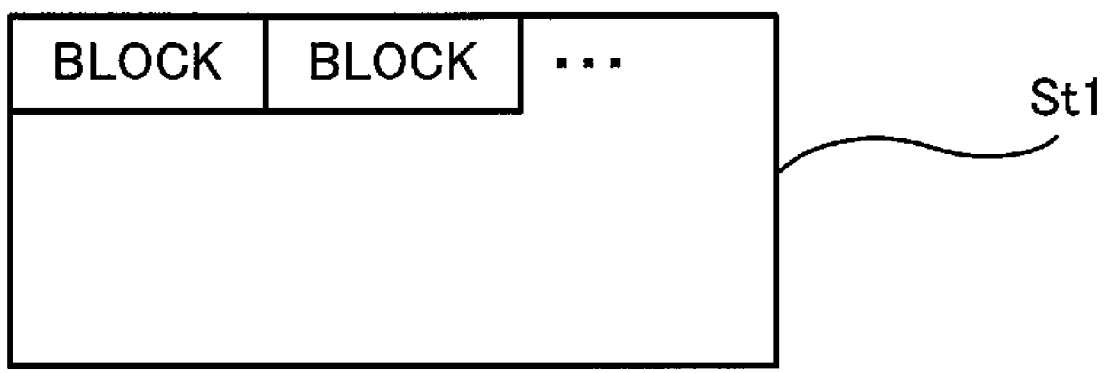
FIG. 5 is a diagram illustrating a structure of a stripe in the first embodiment.

FIG. 5 is a diagram illustrating a structure of a stripe in the first embodiment.

The stripe St1 illustrated in FIG. 5 contains a plurality of blocks, and the capacity of each block is, for example, 512 B (bytes). Data are read and written in each stripe on a block-by-block basis.

Referring back to FIG. 4, the RAID#5 has a function of regenerating data when an HDD fails. For example, when readout of the portions D11, D12, and D13 of the distributed data is requested by the CPU, and the portion D12 is broken, the portion D12 can be recovered by use of the parity data P1. Thus, it is possible to avoid system stop since the distributed data in the failed HDD can be reproduced by use of the parity data or data stored in the other disks.

Further, the RAID disk array 1032 has HDDs 103e and 103f realizing a RAID#1 as illustrated in FIG. 4.

2.4 Hardware Construction of Server

Figure 6:
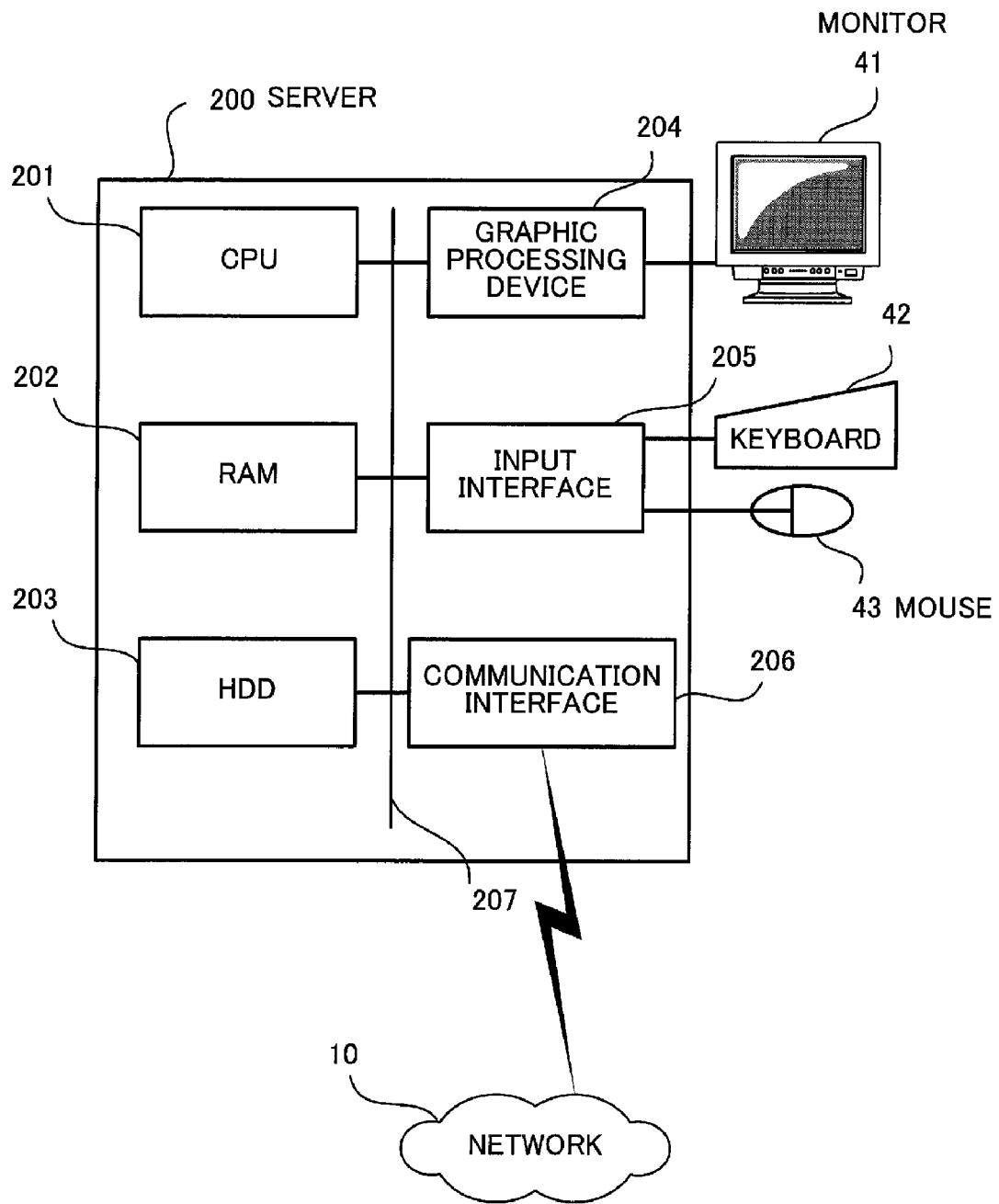
FIG. 6 is a diagram illustrating an example of a hardware construction of a server in the first embodiment.

FIG. 6 is a diagram illustrating an example of a hardware construction of the server 200 used in the first embodiment.

The server 200 is controlled by a CPU (central processing unit) 201, to which a RAM (random access memory) 202, a HDD (hard disk drive) 203, a graphic processing unit 204, an input interface 205, and a communication interface 206 are connected through a bus 207. The RAM 202 temporarily stores at least portions of an OS (operating system) program and application programs which are executed by the CPU 201, as well as various types of data necessary for processing by the CPU 201. The HDD 203 stores program files of the OS program and the application programs. A monitor 41 is connected to the graphic processing unit 204, which makes the monitor 41 display an image on a screen in accordance with an instruction from the CPU 201. The graphic processing device 204 makes the monitor 41 display an image on a screen in accordance with an instruction from the CPU 201. A keyboard 42 and a mouse 43 are connected to the input interface 205, which transmits signals sent from the keyboard 42 and the mouse 43, to the CPU 201 through the bus 207.

The communication interface 206 is connected to the network 10, so that server 200 can exchange data through the communication interface 206 with each of the modules 100a and 100b and other computers.

The functions for performing the processing according to the first embodiment can be realized by using the hardware constructions explained above.

2.5 Functions of Modules in First Embodiment

In order to perform processing for recovering data in the system having the hardware constructions explained above, the modules 100a and 100b have the following functions.

Figure 7:
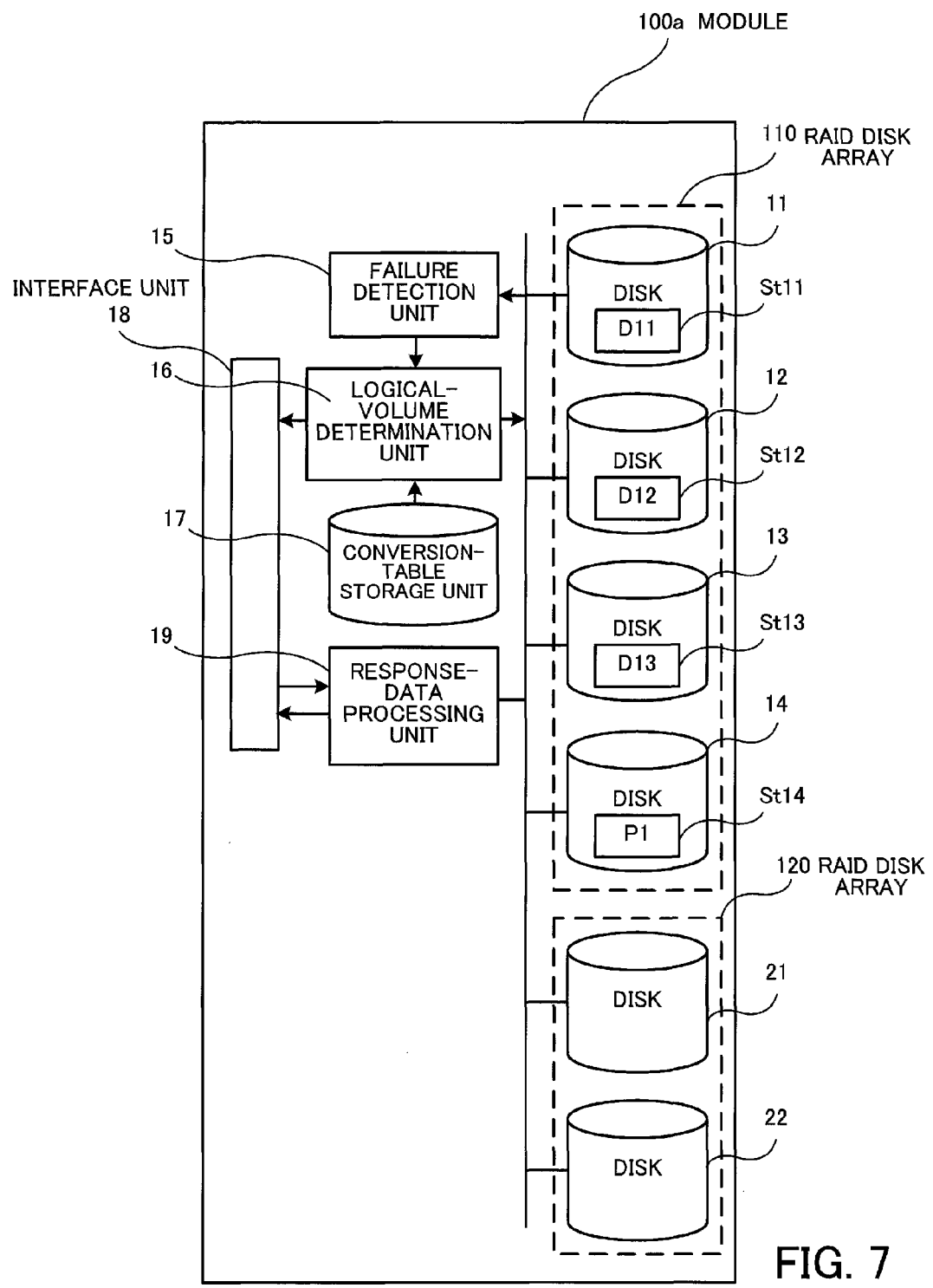
FIG. 7 is a block diagram illustrating the functions of one of modules in the first embodiment.

FIG. 7 is a block diagram illustrating the functions of the module 100a in the first embodiment. The module 100a has RAID disk arrays 110 and 120, a failure detection unit 15, a logical-volume determination unit 16, a conversion-table storage unit 17, an interface unit 18, and a response-data processing unit 19.

The RAID disk array 110 has disks 11, 12, 13, and 14 which realize the RAID#5. The disks 11, 12, 13, and 14 respectively correspond to the aforementioned HDDs 103a, 103b, 103c, and 103d (illustrated in FIG. 4).

In FIG. 7, only one of the stripes stored in each of the disks 11, 12, 13, and 14 (the HDDs 103a, 103b, 103c, and 103d) is illustrated. For example, the portion D11 of the distributed data is stored in the stripe St1 in the disk 11, the portion D12 of the distributed data is stored in the stripe St2 in the disk 12, the portion D13 of the distributed data is stored in the stripe St3 in the disk 13, and the parity data P1 for the distributed data is stored in the stripe St4 in the disk 14.

The RAID disk array 120 has disks 21 and 22 which realize the RAID#1. The disks 21 and 22 respectively correspond to the HDDs 103e and 103f (illustrated in FIG. 4), and store data other than the distributed data D11, D12, and D13.

The failure detection unit 15 periodically monitors the RAID disk arrays 110 and 120, and detects whether or not a readout failure occurs in each block in each stripe in the RAID disk arrays 110 and 120. When a readout failure is detected, the failure detection unit 15 determines the RAID disk array and the location of the block in which the readout failure occurs. (The location of the block is determined by what number from the leading block the block in which the readout failure occurs is located.) In this specification, the readout failure in a disk is such that even after an operation of reading out data from a portion of the disk once fails, the operation of reading out the data from the portion of the disk can be enabled by overwriting of the portion.

When a readout failure occurs in the RAID disk array 110, the failure detection unit 15 determines whether or not the readout failure can be solved in the RAID disk array 110. When yes is determined, the failure detection unit 15 solves the readout failure by regenerating distributed data to be stored in the disk in which the readout failure occurs, by use of the parity data P1. When no is determined, the failure detection unit 15 passes to the logical-volume determination unit 16 information on the location of the block in which the readout failure occurs.

The logical-volume determination unit 16 produces request data for acquiring from the other module the data to be stored in the block, on the basis of a conversion table (which is explained later), and passes the produced request data to the interface unit 18. The logical-volume determination unit 16 realizes the function of the aforementioned request unit 4.

The conversion-table storage unit 17 stores the conversion table. When the interface unit 18 receives the request data, the interface unit 18 sends the request data to the server 200. In addition, when the interface unit 18 receives response data (which is explained later) from the server 200, the interface unit 18 passes the received response data to the response-data processing unit 19. That is, when the interface unit 18 receives data from the inside of the module 100a, the interface unit 18 transmits the received data to the server 200. When the interface unit 18 receives data from the outside of the module 100a, the interface unit 18 transmits the received data to the relevant portion of the module 100a.

The response-data processing unit 19 realizes the main portion of the overwriting unit 7, and performs processing (as explained later) for recovering distributed data in the disk in which the readout failure occurs.

Figure 8:
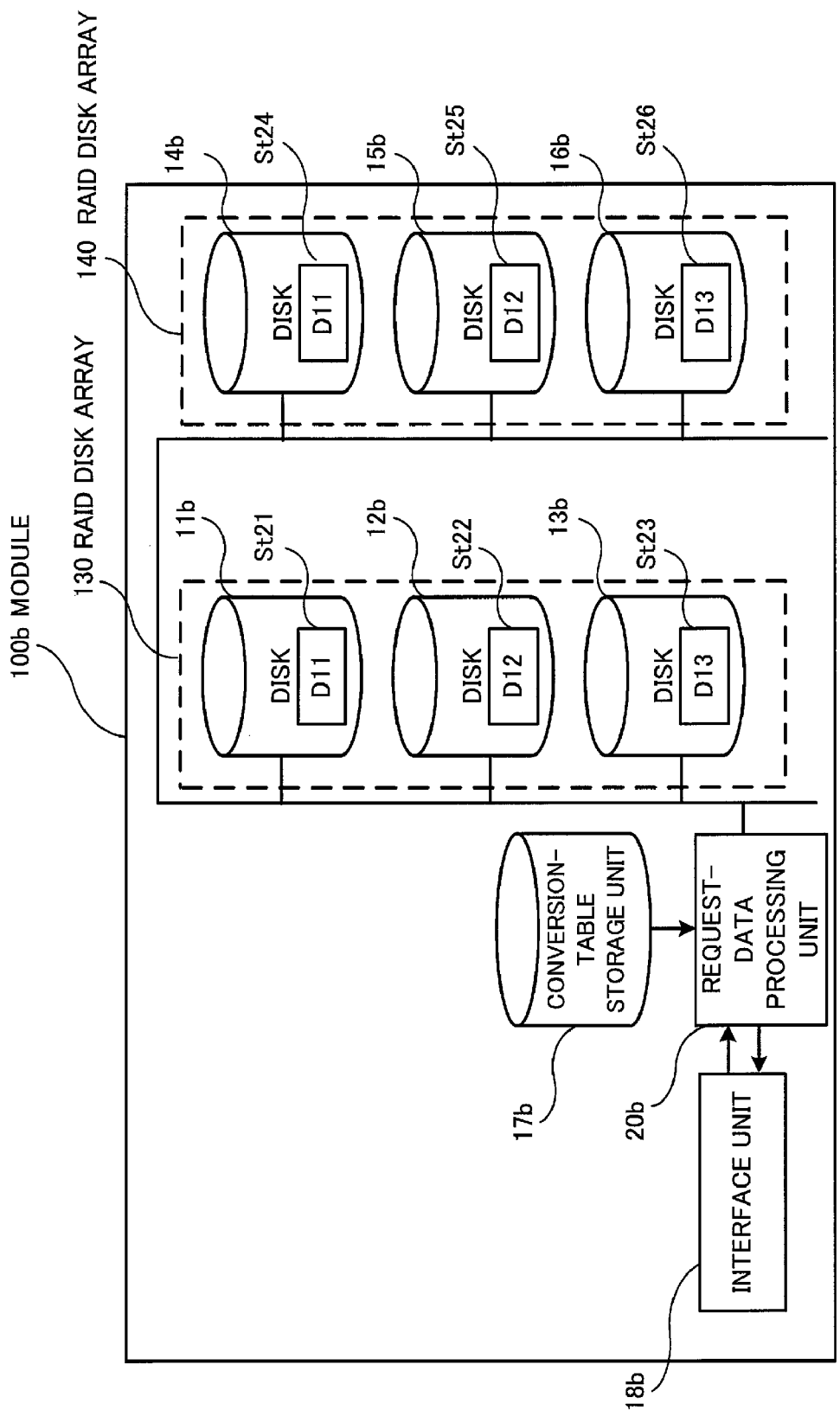
FIG. 8 is a block diagram illustrating the functions of the other of the modules in the first embodiment.

FIG. 8 is a block diagram illustrating the functions of the other module 100b in the first embodiment. The module 100b has RAID disk arrays 130 and 140, a conversion-table storage unit 17b, an interface unit 18b, and a request-data processing unit 20b. The RAID disk array 130 has disks 11b, 12b, and 13b which realize a RAID#0. The RAID disk array 140 has disks 14b, 15b, and 16b which realize a RAID#0.

Further, the RAID disk arrays 130 and 140 constitute a duplexed system. Thus, the RAID disk arrays 130 and 140 realize a RAID#0+1.

The same data as the data stored in the disks 11, 12, and 13 are doubly stored in the disks 11b, 12b, 13b, 14b, 15b, and 16b by mirroring. For example, the portion D11 of the distributed data is stored in the stripe St21 in the disk 11b and the stripe St24 in the disk 14b, the portion D12 of the distributed data is stored in the stripe St22 in the disk 12b and the stripe St25 in the disk 15b, and the portion D13 of the distributed data is stored in the stripe St23 in the disk 13b and the stripe St26 in the disk 16b.

Since the conversion-table storage unit 17b and the interface unit 18b in the module 100b respectively have functions similar to the conversion-table storage unit 17 and the interface unit 18 in the module 100a, the explanations on the functions are not repeated.

When the request-data processing unit 20b receives the request data from the interface unit 18b, the request-data processing unit 20b determines the RAID disk array corresponding to the request data by reference to the conversion table in the conversion-table storage unit 17b, and reads out of the RAID disk array a block corresponding to the block in which the readout failure occurs. Then, the request-data processing unit 20b generates response data containing the block read out of the RAID disk array, and passes the response data to the interface unit 18b.

2.6 Conversion Tables

The conversion tables stored in the conversion-table storage units 17 and 17b are explained below.

The conversion-table storage units 17 and 17b each store an intra-node conversion table and an intra-RAID conversion table. The intra-node conversion table is a conversion table for conversion within the node, and the intra-RAID conversion table is a conversion table for conversion within the RAID disk array.

FIG. 9 is a diagram indicating an example of the intra-node conversion table 171a stored in the conversion-table storage unit 17 in the module 100a. The intra-node conversion table 171a is provided for managing (assigning) a logical volume for each RAID disk array, and has the column for the logical volume and the column for the RAID disk array. Logical volumes are set in the column for the logical volume, and the names of the RAID disk arrays in the module 100a (as information items uniquely identifying RAID disk arrays corresponding to the logical volumes) are indicated in the column for the RAID disk array. The information items tabulated in each row of the intra-node conversion table 171a are associated with each other. In the example of FIG. 9, the logical volume A is associated with the RAID disk array 120, and the logical volume B is associated with the RAID disk array 110.

Figure 10:
FIG. 10 is a diagram indicating an example of an intra-RAID conversion table in the first embodiment.

FIG. 10 is a diagram indicating an example of the intra-RAID conversion table 172a stored in the conversion-table storage unit 17 in the module 100a. The intra-RAID conversion table 172a has the column for the RAID disk array and the column for details of the structure. The names of the RAID disk arrays in the module 100a are indicated in the column for the RAID disk array, and items according to the RAID levels of the RAID disk arrays are indicated in the column for the details of the structure. The information items tabulated in each row of the intra-RAID conversion table 172a are associated with each other. Since the RAID level of the RAID disk array 110 is RAID#5, the RAID level "RAID#5" of, the number of disks in, and the stripe size of the RAID disk array 110 are set in the column for details of the structure in association with the RAID disk array 110. On the other hand, since the RAID level of the RAID disk array 120 is RAID#1, only the RAID level "RAID#1" of the RAID disk array 120 is set in the column for details of the structure in association with the RAID disk array 120.

The contents of (the correspondences indicated in) the intra-node conversion table 171a and the contents of the intra-RAID conversion table 172a can be updated by the server 200 at any time.

Further, the intra-node conversion table and an intra-RAID conversion table stored in the conversion-table storage unit 17b in the module 100b have similar structures to the intra-node conversion table and an intra-RAID conversion table stored in the conversion-table storage unit 17 in the module 100a.

Since data is transferred by use of the logical volumes, it is possible to easily identify the sources of the data even when the physical addresses are unknown.

2.7 Recovery Processing in First Embodiment

An outline of processing which is performed in the system according to the first embodiment for data recovery when a readout failure occurs in the RAID disk array 110 in the module 100a is explained below.

Figure 11:
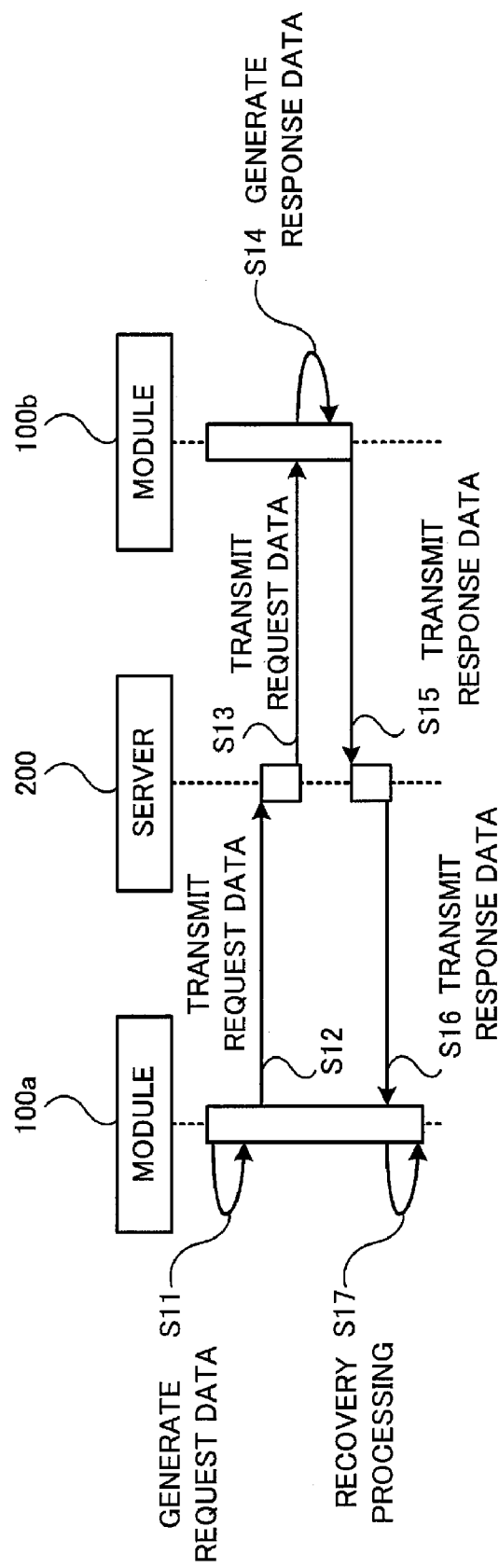
FIG. 11 is a sequence diagram indicating recovery processing performed in the system according to the first embodiment.

FIG. 11 is a sequence diagram indicating recovery processing performed in the system in the first embodiment. When a readout failure occurs in the RAID disk array 110 in the module 100a, in step S11, the module 100a generates request data. Then, in step S12, the module 100a transmits the request data to the server 200. When the server 200 receives the request data, in step S13, the server 200 transmits the request data to the module 10b. When the module 100b receives the request data, in step S14, the module 100b generates response data on the basis of the received request data. Then, in step S15, the server 200 transmits the response data to the server 200. When the server 200 receives the response data, in step S16, the server 200 transmits the response data to the module 100a. When the module 100a receives the response data, in step S17, the module 100a performs recovery processing on the basis of the received response data. Thus, the recovery processing performed by the system in the first embodiment is completed.

Next, details of the processing performed in the modules 100a and 100b during the above recovery processing are explained below.

Figure 12:
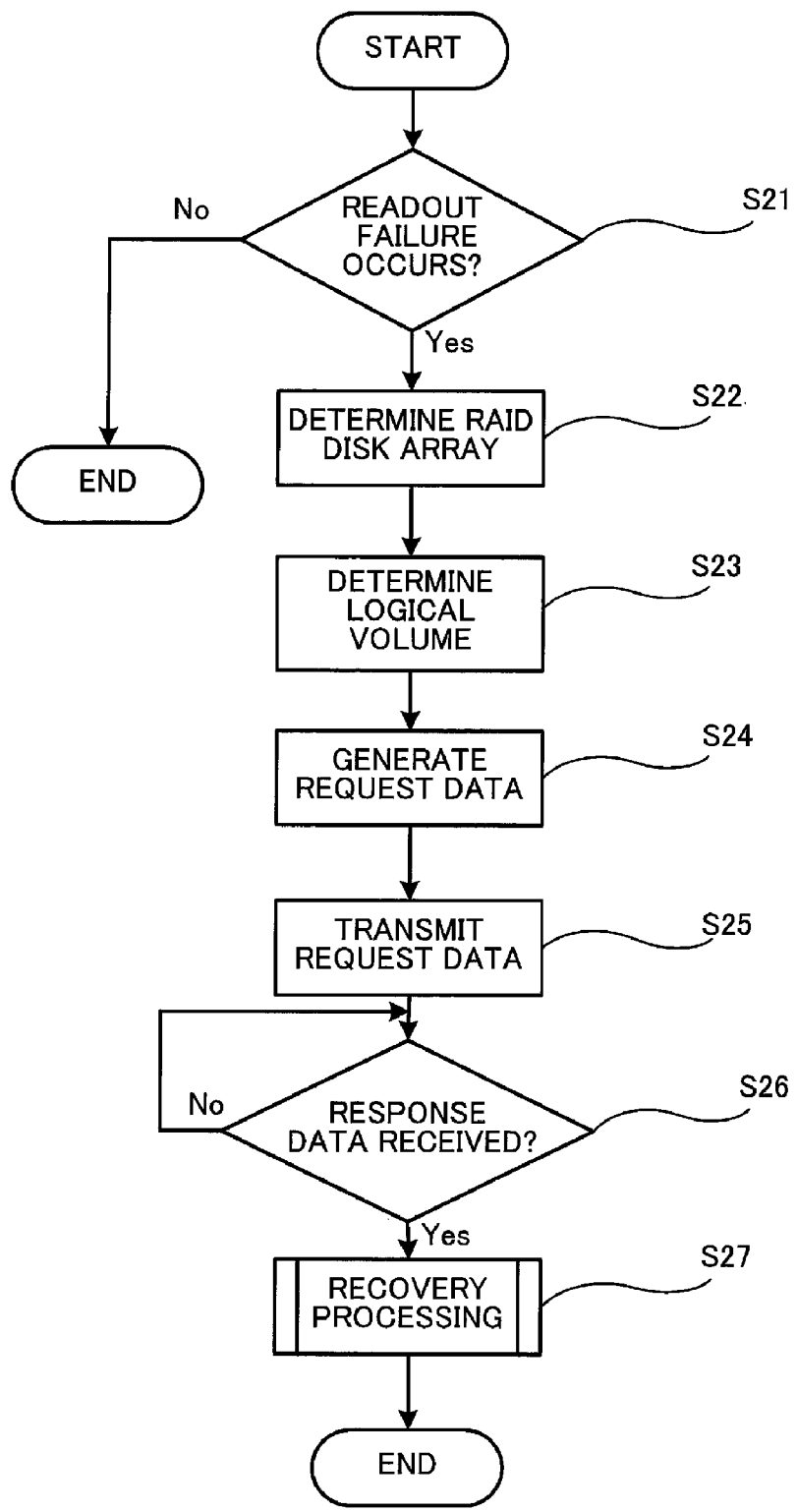
FIG. 12 is a flow diagram indicating a sequence of processing performed by the one of the modules according to the first embodiment for data recovery.

FIG. 12 is a flow diagram indicating a sequence of processing performed in the module 100a according to the first embodiment for data recovery.

First, in step S21, the failure detection unit 15 detects whether or not a readout failure occurs. When no is determined, the processing of FIG. 12 is completed. On the other hand, when yes is determined in step S21, in step S22, the logical-volume determination unit 16 determines the RAID disk array in which the readout failure occurs, on the basis of the information on the location of the block in which the readout failure occurs, by reference to the intra-RAID conversion table 172a. Then, in step S23, the logical-volume determination unit 16 determines the logical volume containing the block in which the readout failure occurs, by reference to the intra-node conversion table 171a. In addition, in step S24, the logical-volume determination unit 16 generates request data containing the name of the determined logical volume, and passes the request data to the interface unit 18.

In step S25, the interface unit 18 transmits the request data to the server 200. Thereafter, in step S26, the interface unit 18 determines whether or not the module 100a receives response data. When no is determined in step S26, the interface unit 18 waits for receipt of the response data. When yes is determined in step S26, in step S27, the response-data processing unit 19 performs the recovery processing. Thus, the processing performed in the module 100a during the recovery processing is completed.

Figure 13:
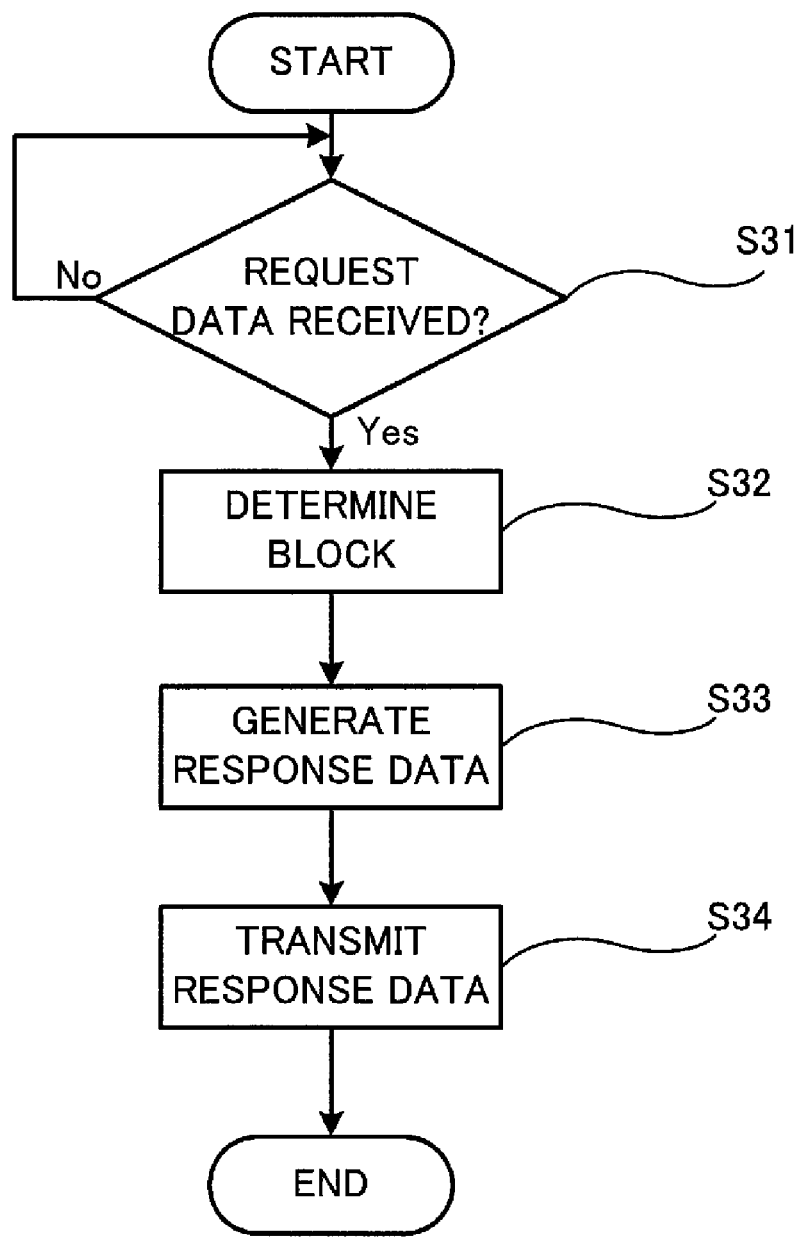
FIG. 13 is a flow diagram indicating a sequence of processing performed by the other of the modules according to the first embodiment for data recovery.

FIG. 13 is a flow diagram indicating a sequence of processing performed in the module 100b according to the first embodiment for data recovery.

First, in step S31, the interface unit 18b detects whether or not the module 100b receives the request data. When no is determined in step S31, the interface unit 18b waits for receipt of the request data. On the other hand, when yes is determined in step S31, in step S32, the request-data processing unit 20b determines the block in which the readout failure occurs, by reference to the intra-node conversion table and the intra-RAID conversion table in the conversion-table storage unit 17b. In addition, the request-data processing unit 20b generates response data containing the determined block in step S33, and the interface unit 18b transmits the response data to the server 200 in step S34. Thus, the processing performed in the module 100b during the recovery processing is completed.

Figure 14:
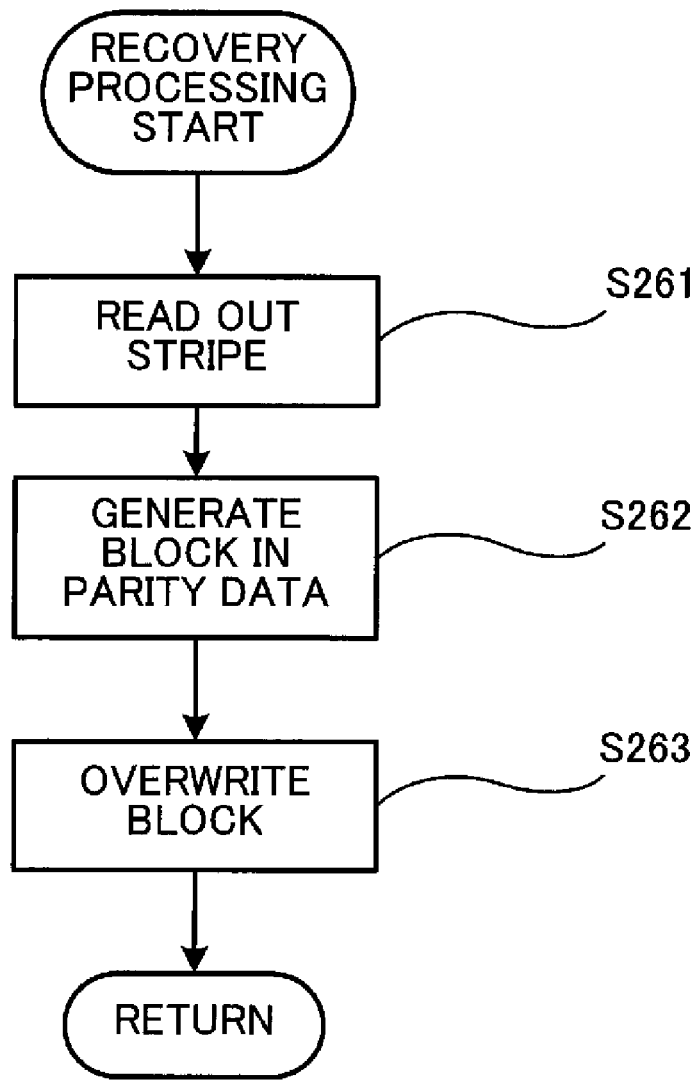
FIG. 14 is a flow diagram indicating a sequence of recovery processing performed in the system according to the first embodiment.

Details of the recovery processing performed in the module 100a in step S27 in the sequence of FIG. 12 are explained with reference to FIG. 14, which is a flow diagram indicating a sequence of the recovery processing performed in the system according to the first embodiment.

First, in step S261, the response-data processing unit 19 reads out all the stripes containing blocks corresponding to the block in which the readout failure occurs, other than the stripe of parity data and the stripe containing the block in which the readout failure occurs, from all the disks in the RAID disk array 110. Then, in step S262, the response-data processing unit 19 generates a block of new parity data on the basis of the mutually corresponding blocks in the stripes read out in step S261 and the block extracted from the response data. Finally, in step S263, the response-data processing unit 19 updates the parity data by overwriting the block containing the old parity data with the block of new parity data. In addition, the response-data processing unit 19 overwrites the block in which the readout failure occurs, with the block extracted from the response data. Thus, the recovery processing is completed.

Next, a concrete example of the recovery processing performed in the system according to the first embodiment is indicated below. In this example, it is assumed that readout failures concurrently occur in the block B13 in the portion D13 of distributed data and the corresponding block of the parity data P1 (which is stored for recovering the block B13), so that the readout failures are irrecoverable by use of only the data stored in the RAID disk array 110.

First, the failure detection unit 15 passes to the logical-volume determination unit 16 the information on the location of the block B13 (in which the readout failure occurs). Then, the logical-volume determination unit 16 determines the logical volume containing the block B13 (in which the readout failure occurs) by reference to the intra-RAID conversion table 172a and the intra-node conversion table 171a, generates request data containing the name of the determined logical volume, and passes the generated request data to the interface unit 18. The interface unit 18 transmits the request data to the server 200. Thereafter, the interface unit 18 waits for response data.

When the interface unit 18b receives the request data, the request-data processing unit 20b determines the disk 13b by reference to the intra-node conversion table and the intra-RAID conversion table (which are stored in the conversion-table storage unit 17b). Then, the request-data processing unit 20b calculates the location of the block B13 in the portion D13 of the distributed data in the disk 13b, extracts the block B13 from the disk 13b, and generates response data. Thereafter, the interface unit 18b transmits the response data to the server 200.

Figure 15:
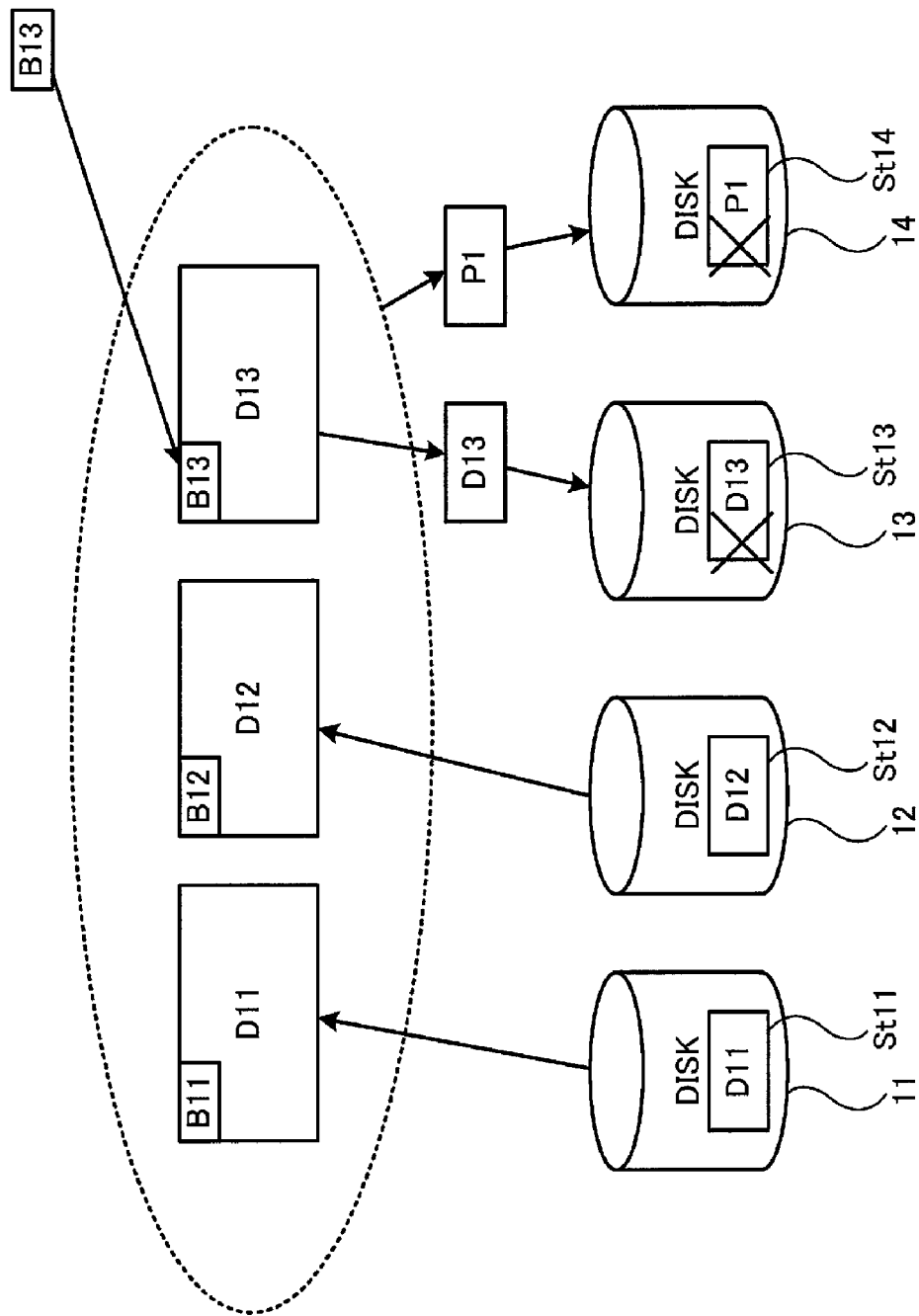
FIG. 15 is a conceptual diagram presented for explaining an outline of data recovery according to the first embodiment in an exemplary situation.

An outline of operations performed after the above operations for data recovery in the above concrete example are illustrated in FIG. 15. As illustrated in FIG. 15, when the interface unit 18 receives the above response data, the response-data processing unit 19 reads out the portions D11 and D12 of the distributed data stored in the disks 11 and 12, and then generates new parity data P1 on the basis of the blocks B11 and B12 in the portions D11 and D12 of the distributed data and the block 13 extracted from the received response data. Thereafter, the interface unit 18 updates the parity data in the disk 14 by overwriting the disk 14 with the new parity data P1. In addition, the interface unit 18 overwrites the region in the disk 13 in which the readout failure occurs, with the portion D13 of the distributed data. Thus, the recovery processing is completed.

2.8 Advantages of First Embodiment

As explained above, according to the first embodiment, when a readout failure occurs, data for use in recovery is produced by taking advantage of the redundant structure between the modules 100a and 100b, and the region in which the readout failure occurs is overwritten with the produced data, so that the data in the region in which the readout failure occurs can be easily recovered. Therefore, the amount of data which is processed for data recovery can be greatly reduced. In addition, influence on other access to the storage device during the data recovery can be suppressed. Thus, it is possible to increase the reliability of the system.

2.9 Variations of First Embodiment (1) As explained above, according to the first embodiment, the recovery processing is performed when a readout failure occurs. Alternatively, the system according to the first embodiment may be modified so as to determine that a physical failure occurs, and not to perform the recovery processing, when the number or frequency of occurrences of readout failures reaches a certain value, or when a readout failure occurs in a specific physical region (e.g., a continuous region) of a disk. In this case, it is possible to increase the processing efficiency by performing processing other than the recovery processing when a failure other than the readout failure occurs.

(2) As explained above, according to the first embodiment, the module 100a generates the request data, and transmits the generated request data to the server 200. Alternatively, the system according to the first embodiment may be modified so that the server 200 generates request data. In this case, the server 200 receives a request for acquiring data for a block stored in the disk in the module 100a in which a readout failure occurs, generates request data, transmits the request data to the module 100b, acquires response data from the module 100b, and transmits the response data to the module 100a.

(3) As explained above, according to the first embodiment, the recovery processing is performed through the server 200. Alternatively, the system according to the first embodiment may be modified so that tables for identifying the modules 100a and 100b are provided to the modules 100a and 100b when the system starts, and data are directly transmitted between the modules 100a and 100b by reference to the tables without the aid of the server 200.

(4) As explained above, according to the first embodiment, the recovery processing is performed between the modules 100a and 100b. Alternatively, the system according to the first embodiment may be modified so as to perform recovery processing among three or more modules. Even in this case, data is transferred by use of the logical volume. Therefore, it is also possible to easily identify the sources of the data even when the physical addresses are unknown.

3. Second Embodiment

Next, a system according to the second embodiment is explained below. The following explanations on the second embodiment are focused on the differences from the first embodiment, and the same explanations as the first embodiment are not repeated unless necessary.

3.1 Structure of Logical Volumes

The system according to the second embodiment is similar to the first embodiment except that the logical volumes are assigned and managed in a distributed manner on a segment-by-segment basis.

Figure 16:
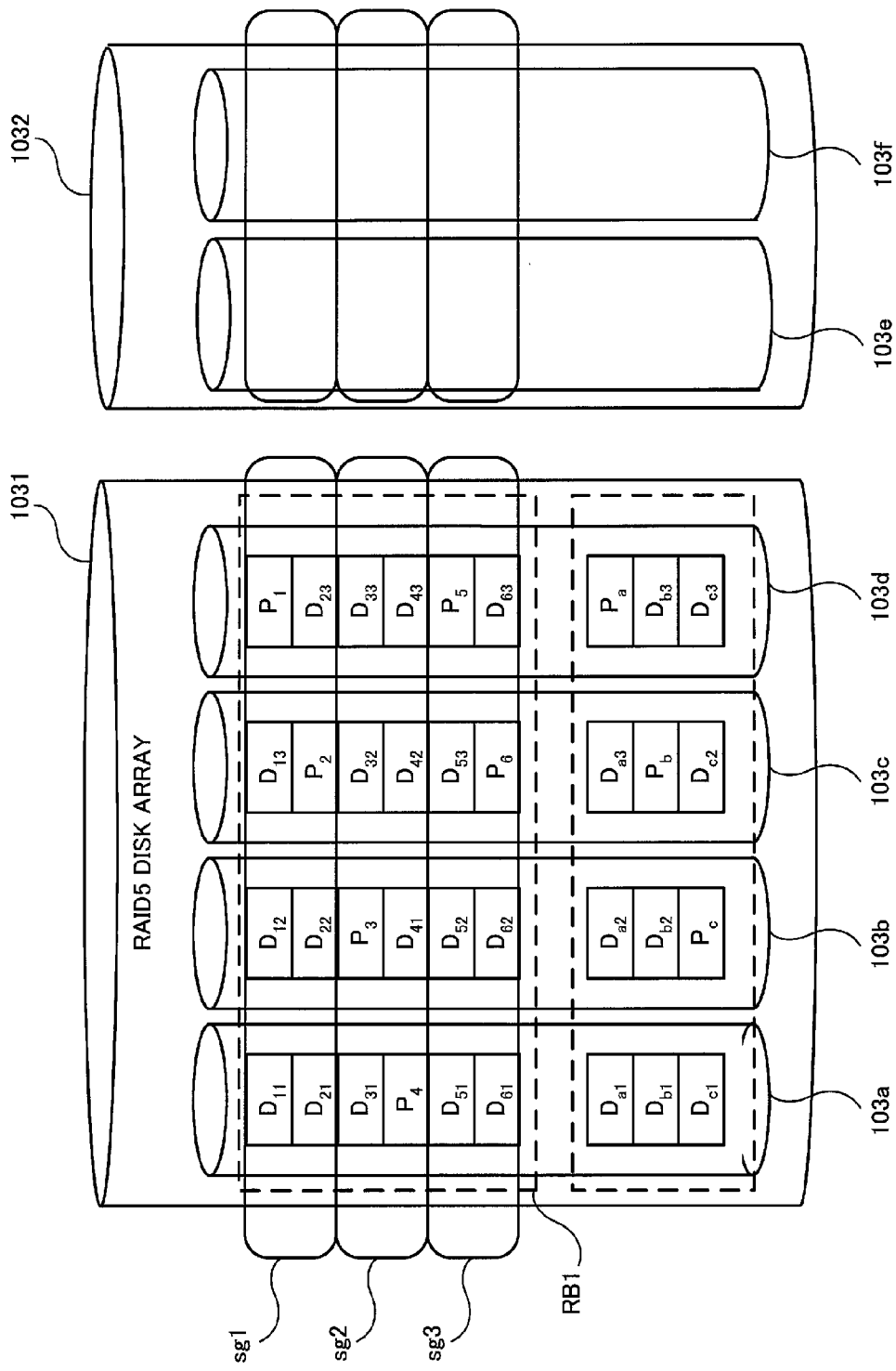
FIG. 16 is a diagram indicating unit regions of a RAID disk array which are managed in a system according to a second embodiment.

FIG. 16 is a diagram indicating unit regions of a RAID disk array managed in a system according to the second embodiment. In the arrangement of FIG. 16, the logical volume RB1 of the RAID disk array 1031 is constituted by three segments sg1, sg2, and sg3. The size of each segment (segment size) is predetermined, and each segment contains more than one stripe. Similarly, the logical volume of the RAID disk array 1032 is also constituted by a plurality of segments.

3.2 Intra-node Conversion Table

The intra-node conversion table stored in the conversion-table storage unit 17 in the module 100a according to the second embodiment is explained below. FIG. 17 illustrates the intra-node conversion table 173a according to the second embodiment.

As illustrated in FIG. 17, in the intra-node conversion table 173a, the logical volumes are assigned and managed in a distributed manner on a segment-by-segment basis. The intra-node conversion table 173a has the column for the logical volume and the column for the RAID disk array. Information items uniquely identifying the names of logical volumes and the names of segments are indicated in the column for the logical volume, and the names of the RAID disk arrays and the names of segments are indicated in the column for the RAID disk array. The information items tabulated in each row of the intra-node conversion table 173a are associated with each other.

In addition, the conversion-table storage unit 17b in the module 100b also contains an intra-node conversion table which has a similar structure to the intra-node conversion table 173a in the conversion-table storage unit 17 in the module 100a.

3.3 Recovery Processing in Second Embodiment

The recovery processing which is performed in the system according to the second embodiment when a readout failure occurs in the RAID disk array 110 in the module 100a is explained below.

First, the processing which is performed in the module 100a for data recovery is explained.

The logical-volume determination unit 16 determines the segment of the RAID disk array in which the readout failure occurs, by reference to information on the location of the block in which the readout failure occurs, the segment size, and the information indicated in the intra-RAID conversion table 172a. In addition, the logical-volume determination unit 16 determines the logical volume and the segment which contain the block in which the readout failure occurs, by reference to the intra-node conversion table 173a. Subsequently, the logical-volume determination unit 16 generates request data containing the determined logical volume and the determined segment, and passes the request data to the interface unit 18. Thereafter, operations similar to the operations performed in the first embodiment after the reception of the request data by the interface unit 18 are performed.

Next, the processing which is performed in the module 100b is explained.

When the interface unit 18b receives the request data, the request-data processing unit 20b determines the RAID disk array and the segment containing the block in which the readout failure occurs, by reference to the intra-node conversion table in the conversion-table storage unit 17b. In addition, the request-data processing unit 20b determines the block in which the readout failure occurs, by reference to the intra-RAID conversion table. Thereafter, the request-data processing unit 20b generates response data containing the block determined as above, and the interface unit 18b transmits the response data to the server 200. Thus, the processing performed in the module 100b is completed.

The system according to the second embodiment can achieve advantages similar to the first embodiment. Further, according to the second embodiment, the readout failure is detected on a segment-by-segment basis. Therefore, it is possible to more finely designate regions for detection of the readout failure, and more flexibly manage the logical volumes.

4. Third Embodiment

Next, a system according to the third embodiment is explained below. The following explanations on the third embodiment are focused on the differences from the first embodiment, and the same explanations as the first embodiment are not repeated unless necessary.

As explained below, in the system according to the third embodiment, data can be recovered even when readout failures occur in more than one module.

4.1 Modules in Third Embodiment

The system according to the third embodiment has modules 100c and 100d.

Figure 18:
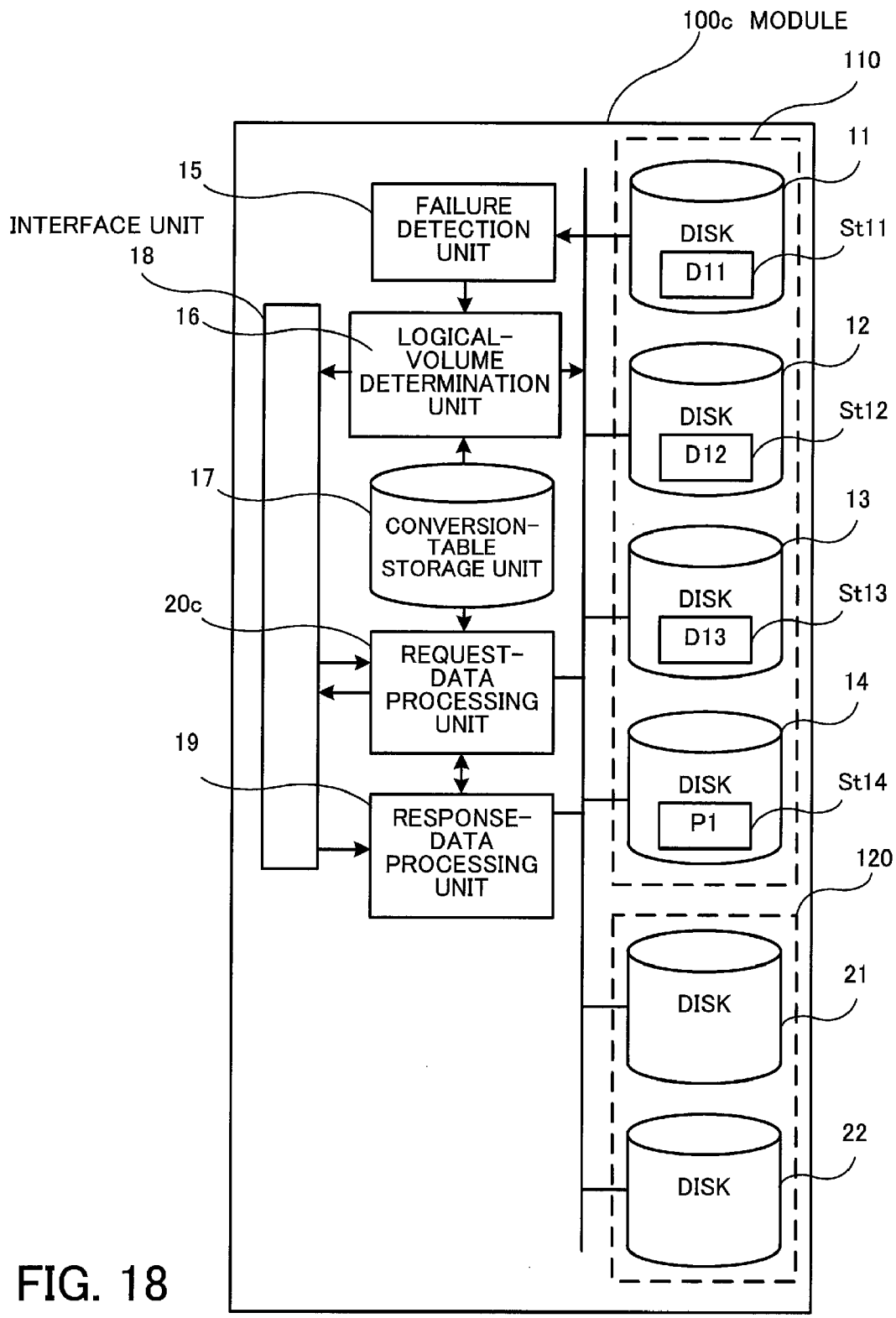
FIG. 18 is a block diagram illustrating the functions of one of modules in a third embodiment.

FIG. 18 is a block diagram illustrating the functions of the module 100c in the third embodiment. As illustrated in FIG. 18, the module 100c has a request-data processing unit 20c in addition to the elements of the module 100a according to the first embodiment. The request-data processing unit 20c in the module 100c is similar to the request-data processing unit 20b in the module 100b according to the first embodiment.

Figure 19:
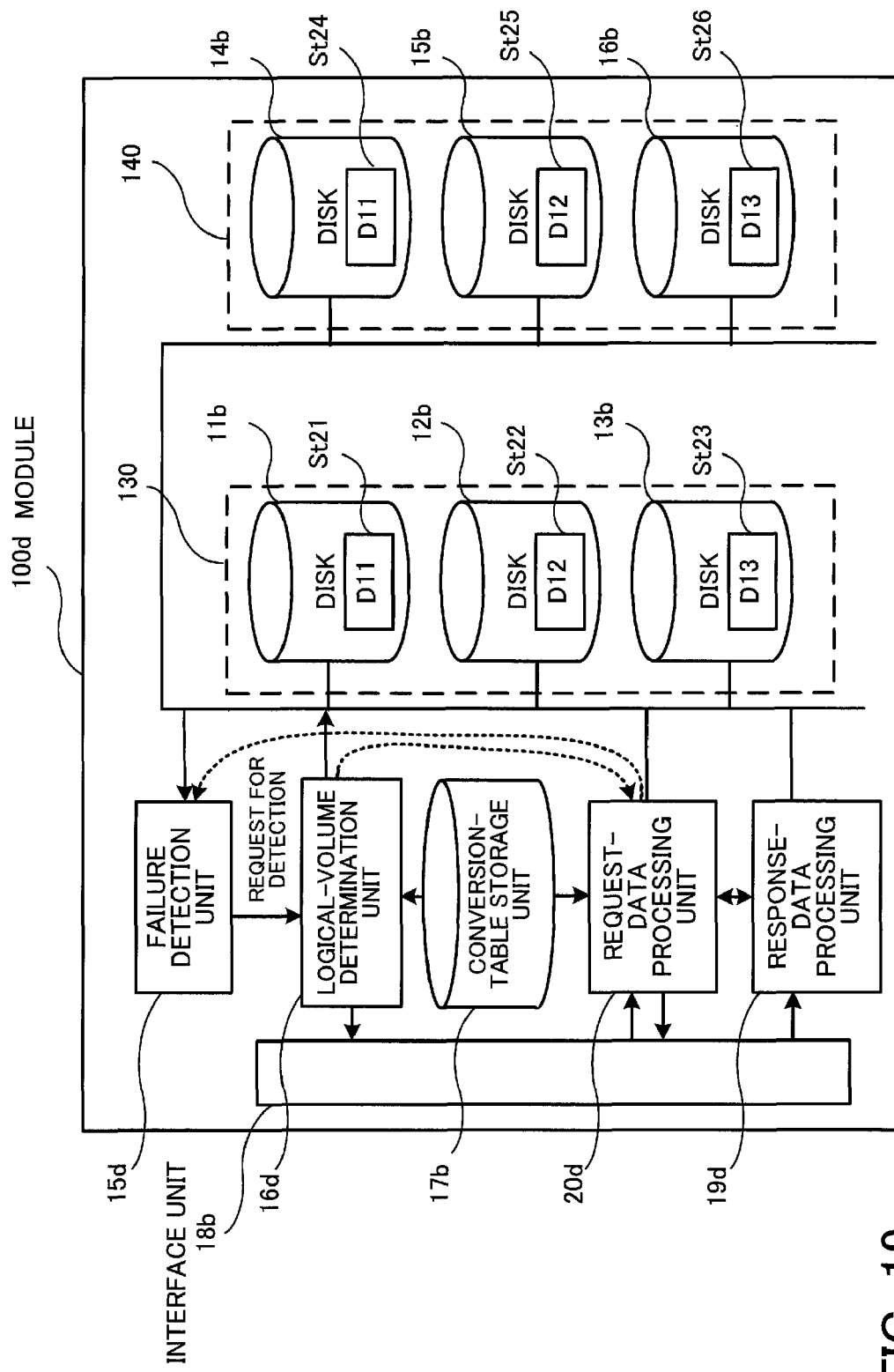
FIG. 19 is a block diagram illustrating the functions of the other of the modules in the third embodiment.

FIG. 19 is a block diagram illustrating the functions of the other module 100d in the third embodiment. As illustrated in FIG. 19, the module 100d has a failure detection unit 15d, a logical-volume determination unit 16d, a response-data processing unit 19d, and a request-data processing unit 20d as well as the conversion-table storage unit 17b, the interface unit 18b, and the RAID disk arrays 130 and 140 which are similar to the module 100b in the first embodiment.

The failure detection unit 15d has the same functions as the aforementioned failure detection unit 15 in the module 100a according to the first embodiment. That is, the failure detection unit 15d periodically monitors the RAID disk arrays 130 and 140, and detects whether or not a readout failure occurs in each disk in the RAID disk arrays 130 and 140. When the failure detection unit 15d receives from the request-data processing unit 20d a request for detection, the failure detection unit 15d detects whether or not a readout failure occurs, and passes a response to the request to the logical-volume determination unit 16d, where the response includes information on the location of the block in which the readout failure occurs.

The logical-volume determination unit 16d has the same functions as the logical-volume determination unit 16 in the module 100a according to the first embodiment. That is, when the logical-volume determination unit 16d receives a detection result which does not relate to the request for detection received from the request-data processing unit 20d, the logical-volume determination unit 16d generates request data on the basis of the detection result, and transmits the request data to the interface unit 18b. When the logical-volume determination unit 16d receives a detection result in response to a request for detection, the logical-volume determination unit 16d generates request data on the detection result, and transmits the request data to the request-data processing unit 20d (instead of the interface unit 18b).

The response-data processing unit 19d has the same functions as the response-data processing unit 19 in the module 100a according to the first embodiment, and the request-data processing unit 20d has the same functions as the request-data processing unit 20b in the module 100b according to the first embodiment. Specifically, when the request-data processing unit 20d receives request data from the interface unit 18b, the request-data processing unit 20d determines the corresponding disk by reference to the intra-node conversion table and the intra-RAID conversion table, and reads out the corresponding block from the disk. Then, the request-data processing unit 20d generates response data containing the block read out as above, and sends a request for detection to the failure detection unit 15d. Thereafter, when the request-data processing unit 20d receives request data from the logical-volume determination unit 16d, the request-data processing unit 20d generates response-and-request data by attaching the request data to the response data, and sends the response-and-request data to the interface unit 18b. When the request-data processing unit 20d does not receive request data until a predetermined time elapses after the request-data processing unit 20d sends the request for detection to the failure detection unit 15d, the request-data processing unit 20d determines that no request data exists, and the request-data processing unit 20d sends the response data to the interface unit 18b. Thus, the request-data processing unit 20d realizes one function of the request unit and the main parts of the reception unit and the transmission unit in the system management apparatus.

4.2 Recovery Processing in Third Embodiment

An outline of processing which is performed for data recovery when a readout failure occurs in the system according to the third embodiment is explained below.

Figure 20:
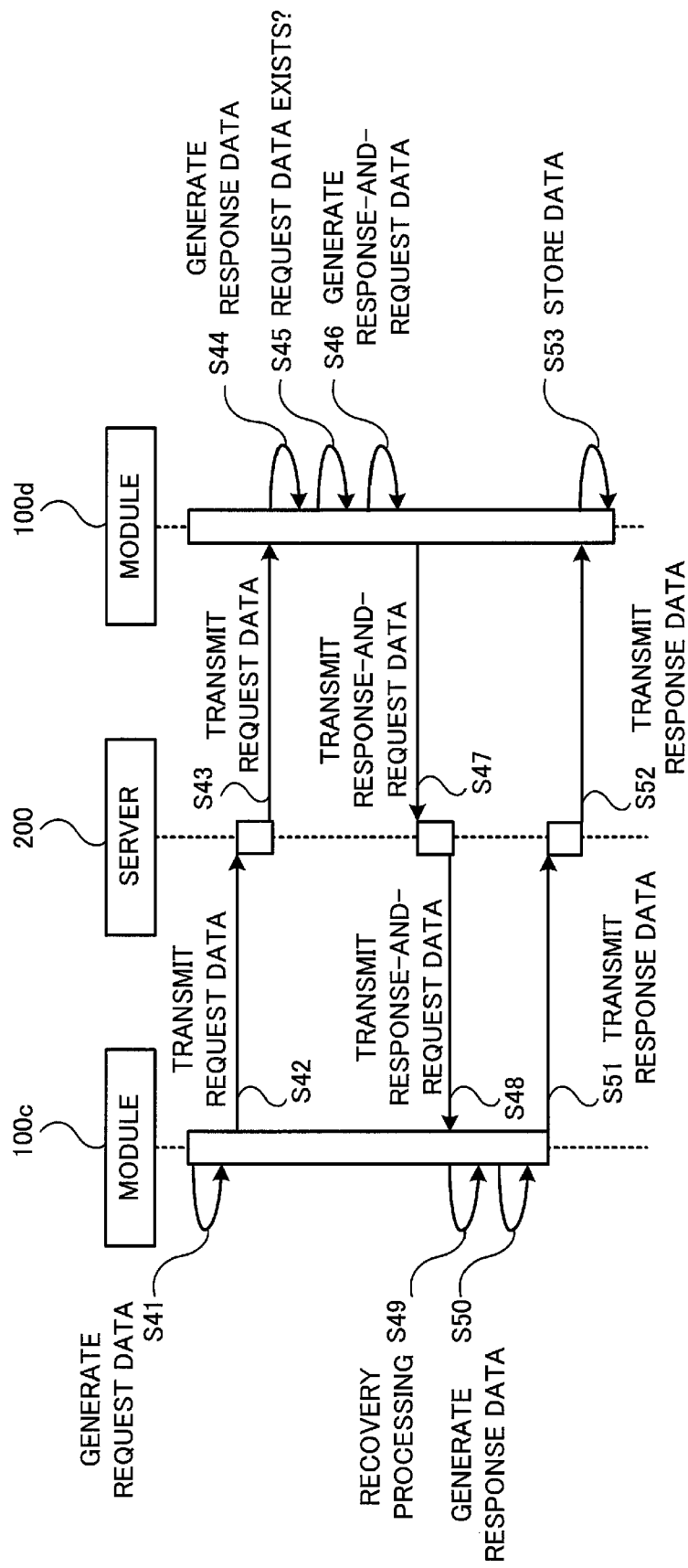
FIG. 20 is a sequence diagram indicating recovery processing performed in the system in the third embodiment.

FIG. 20 is a sequence diagram indicating recovery processing performed in the system according to the third embodiment.

In steps S41 to S44, operations similar to the operations in steps S11 to S14 indicated in FIG. 11 are performed.

Thereafter, in step S45, the module 100d determines whether or not request data exists in the module 10d. When no is determined, operations similar to the operations in step S15 and the following steps in FIG. 11 are performed. When yes is determined, in step S46, the module 100d generates response-and-request data by attaching to the response data the request data existing in the module 10d. Subsequently, in step S47, the module 100d transmits to the server 200 the response-and-request data generated as above. When the server 200 receives the response-and-request data, in step S48, the server 200 transmits the received response-and-request data to the module 100c. When the module 100c receives the response-and-request data, in step S49, the module 100c performs recovery processing on the basis of the received response-and-request data. After that, in step S50, the module 100c generates response data on the basis of request data contained in the received response-and-request data. Then, in step S51, the module 100c transmits to the server 200 the response data generated as above.

When the server 200 receives the response data, in step S52, the server 200 transmits the received response data to the module 10d. When the module 100d receives the response data, in step S53, the module 100d stores data based on the received response data in the block in which the readout failure occurs. Thus, the recovery processing is completed.

Next, details of the processing performed in the modules 100c and 100d in the above recovery processing are explained below.

Figure 21:
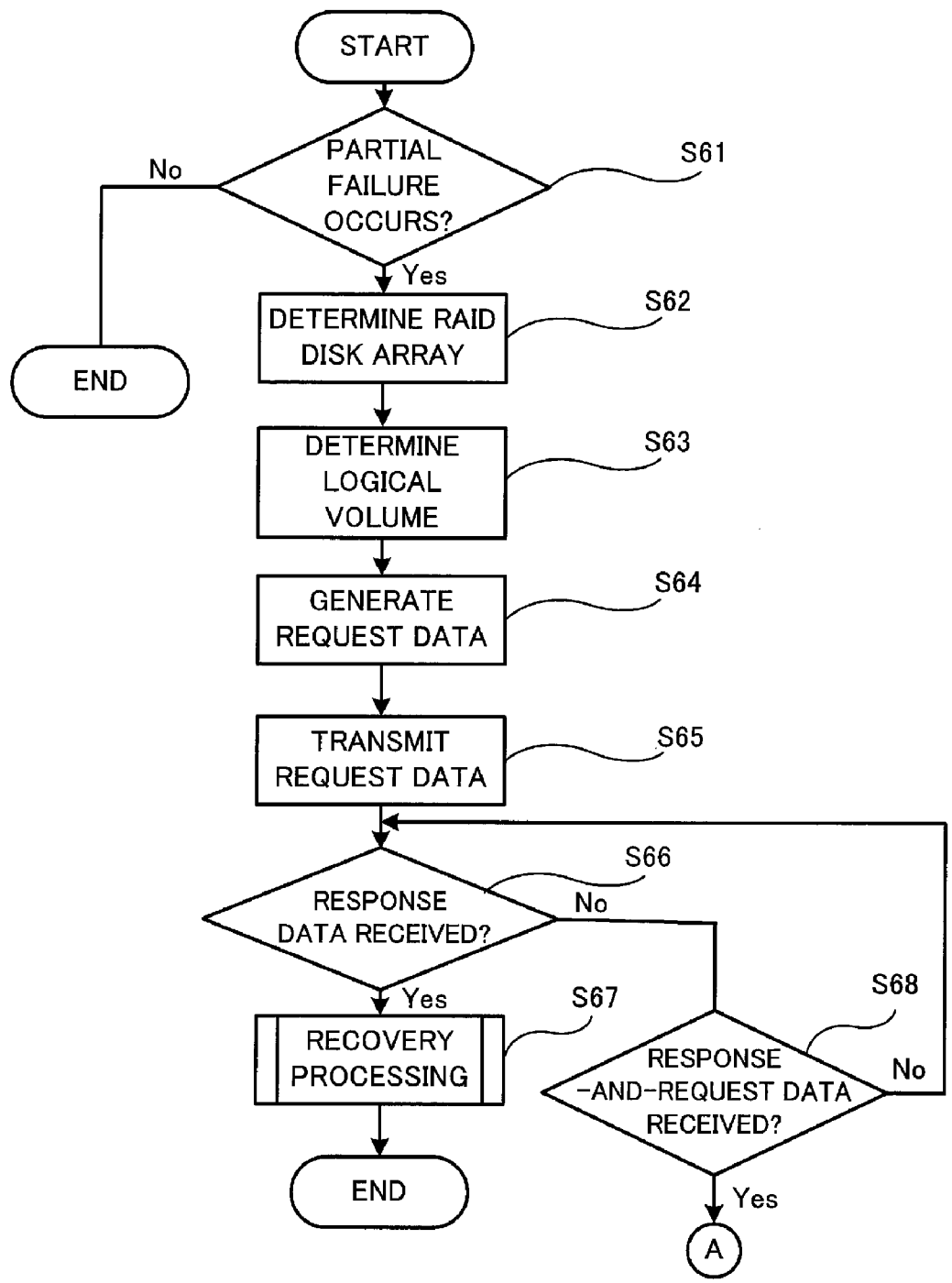
FIGS. 21 and 22 are flow diagrams indicating a sequence of processing performed by the one of the modules according to the third embodiment for data recovery.
Figure 22:
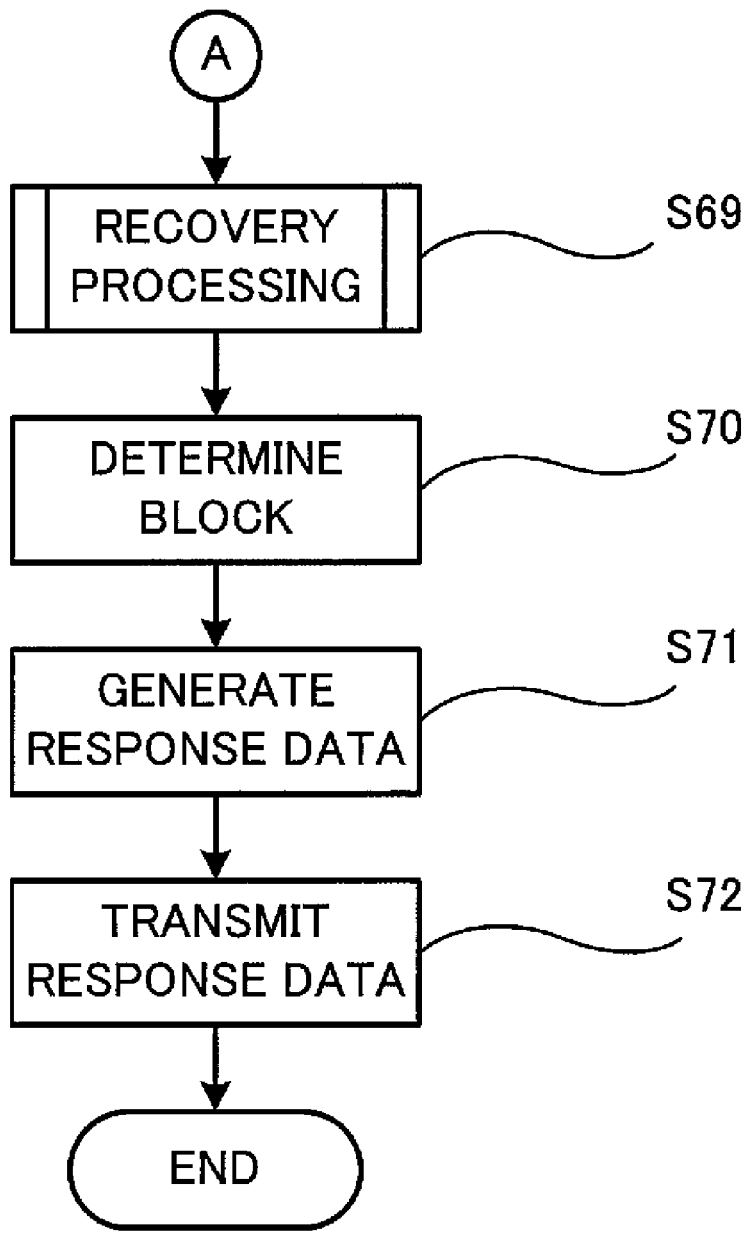

FIGS. 21 and 22 illustrate a flow diagram indicating a sequence of processing performed in the module 100c according to the third embodiment for data recovery.

In steps S61 to S65 indicated in FIG. 21, operations similar to the operations in steps S21 to S25 indicated in FIG. 12 are performed.

Subsequently, in step S66, the interface unit 18 determines whether or not the module 100c receives the response data. When yes is determined, in step S67, the response-data processing unit 19 performs recovery processing, and the processing of FIGS. 21 and 22 is completed. On the other hand, when no is determined in step S66, in step S68, the interface unit 18 determines whether or not the module 100c receives response-and-request data. When no is determined in step S68, the operation goes to step S66. On the other hand, when yes is determined in step S68, in step S69 (indicated in FIG. 22), the response-data processing unit 19 performs recovery processing, and thereafter passes the response-and-request data to the request-data processing unit 20c.

Thereafter, in step S70, the request-data processing unit 20c determines the block in which the readout failure occurs, by reference to the intra-node conversion table 171a and the intra-RAID conversion table 172a. Then, in step S71, the request-data processing unit 20c generates response data containing the block determined in step S70. Finally, in step S72, the interface unit 18 transmits the above response data to the server 200. Thus, the processing performed by the module 100c during the recovery processing is completed.

Figure 23:
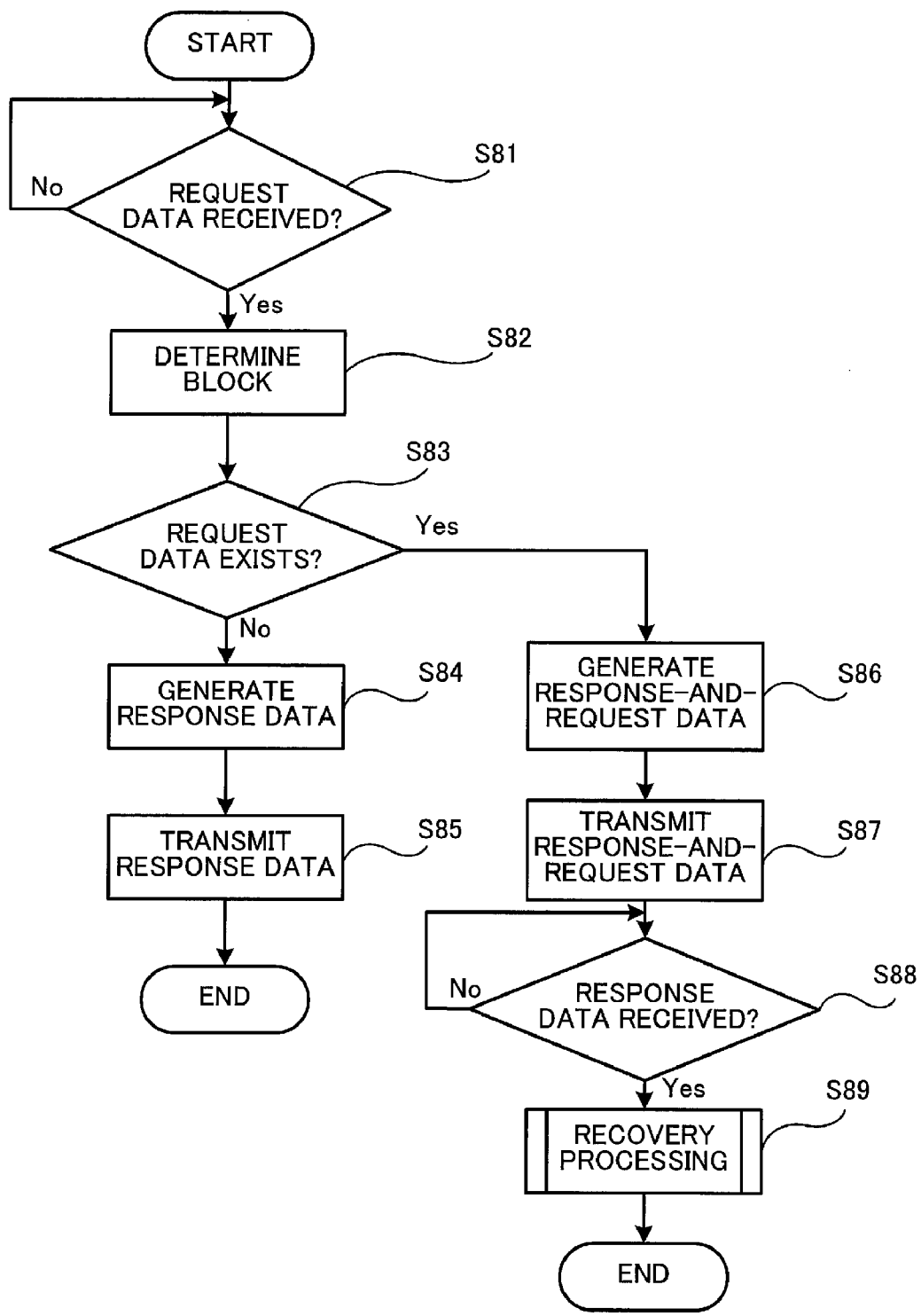
FIG. 23 is a flow diagram indicating a sequence of processing performed by the other of the modules according to the third embodiment for data recovery.

FIG. 23 is a flow diagram indicating a sequence of processing performed in the module 100d according to the third embodiment for data recovery.

First, in step S81, the interface unit 18b detects whether or not the module 100d receives the request data. When no is determined, the interface unit 18b waits for receipt of the request data. On the other hand, when yes is determined in step S81, in step S82, the request-data processing unit 20b determines the block in which the readout failure occurs, by reference to the intra-node conversion table and the intra-RAID conversion table in the conversion-table storage unit 17b. Subsequently, in step S83, the request-data processing unit 20d determines whether or not request data to be transmitted to the module 100c exists. When no is determined in step S83, the request-data processing unit 20d generates response data in step S84. Then, in step S85, the interface unit 18 transmits the generated response data to the server 200, and then the processing of FIG. 23 is completed. On the other hand, when yes is determined in step S83, in step S86, the request-data processing unit 20d generates response-and-request data. Then, in step S87, the interface unit 18b transmits the response-and-request data to the server 200.

Thereafter, in step S88, the interface unit 18b determines whether or not the module 100d receives response data corresponding to the response-and-request data transmitted in step S87. When no is determined in step S88, the interface unit 18b waits for the response data. On the other hand, when yes is determined in step S88 in step S89, the response-data processing unit 19 performs recovery processing. Thus, the processing performed by the module 100d during the recovery processing is completed.

Next, a concrete example of the recovery processing performed in the system according to the third embodiment is indicated below.

In this example, it is assumed that readout failures occur in the block B13 in the portion D13 of distributed data and the corresponding block in the parity data P1 (for recovering the block B13) which are stored in the disk 13 in the module 100c and the block B11 in the portion D11 of distributed data stored in each of the disks 11b and 14b in the module 100d.

First, the failure detection unit 15 in the module 100c passes to the logical-volume determination unit 16 the information on the location of the block B13 (in which the readout failure occurs). Then, the logical-volume determination unit 16 determines the logical volume containing the block B13 by reference to the intra-RAID conversion table 172a and the intra-node conversion table 171a, generates request data containing the determined logical volume, and passes the generated request data to the interface unit 18. The interface unit 18 transmits the request data to the server 200. Thereafter, the interface unit 18 waits for response data.

When the interface unit 18b in the module 100d receives the request data, the request-data processing unit 20d determines the disk 13b by reference to the intra-node conversion table and the intra-RAID conversion table which are stored in the conversion-table storage unit 17b. Then, the request-data processing unit 20d calculates the location of the block B13 in the portion D13 of the distributed data in the disk 13b, extracts the block B13 from the disk 13b, and generates response data. Further, at this time, the request-data processing unit 20d sends a request for detection to the failure detection unit 15d. Then, the failure detection unit 15d performs an operation for detecting a readout failure in each block, so that the failure detection unit 15d detects a readout failure in the block B11 in each of the disks 11b and 14b, and the failure detection unit 15d passes to the logical-volume determination unit 16d information on the location of the block B11 (in which the readout failure occurs). Then, the logical-volume determination unit 16d determines the logical volume containing the block B11 (in which the readout failure occurs) by reference to the intra-node conversion table and the intra-RAID conversion table which are stored in the conversion-table storage unit 17b, generates request data containing the determined logical volume, and passes the generated request data to the request-data processing unit 20d. The request-data processing unit 20d receives the request data requesting the block B11 and the response data containing the block B13, and generates response-and-request data. Subsequently, the interface unit 18b transmits the response-and-request data to the server 200.

Figure 24:
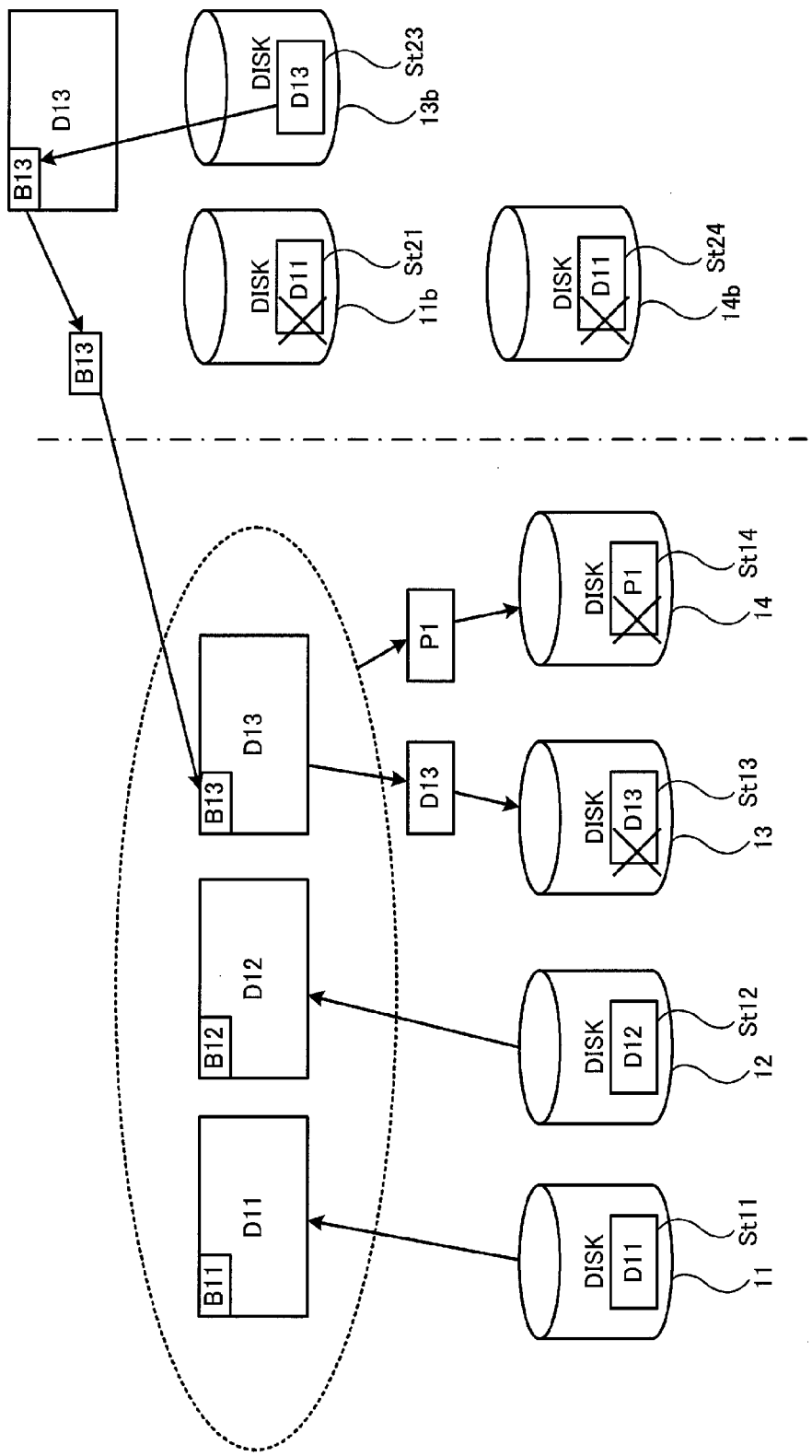
FIGS. 24 and 25 are diagrams presented for explaining an outline of data recovery according to the third embodiment in an exemplary situation.
Figure 25:
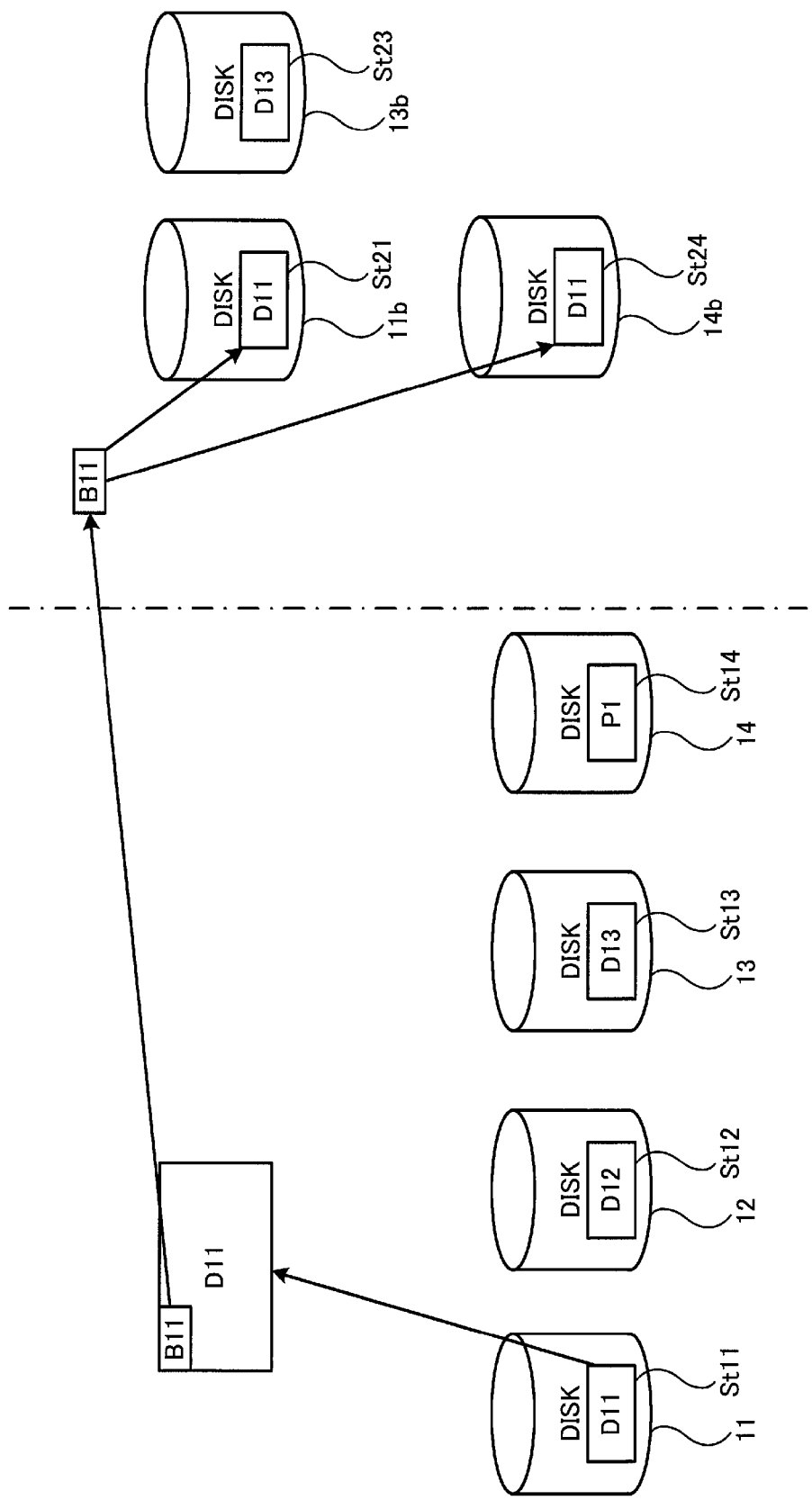

An outline of operations performed for data recovery after the above operations in the above concrete example are illustrated in FIGS. 24 and 25.

As illustrated in FIG. 24, when the interface unit 18 in the module 100c receives the above response-and-request data, the response-data processing unit 19 reads out the portions D11 and D12 of the distributed data stored in the disks 11 and 12, and then generates new parity data P1 on the basis of the blocks B11 and B12 in the portions D11 and D12 of the distributed data and the block B13 extracted from the received response-and-request data. Thereafter, the response-data processing unit 19 updates the parity data in the disk 14 by overwriting the disk 14 with the new parity data P1. In addition, the response-data processing unit 19 overwrites the region in the disk 13 in which the readout failure occurs, with the portion D13 of the distributed data. Thereafter, the response-data processing unit 19 passes the response-and-request data to the request-data processing unit 20c. At this time, the request-data processing unit 20c determines the disk 11 by reference to the intra-node conversion table 171a and the intra-RAID conversion table 172a. Subsequently, the request-data processing unit 20d calculates the location of the block B11 in the portion D11 of the distributed data in the disk 11, extracts the block B11 from the disk 11, and generates response data. Then, the interface unit 18 transmits the response data to the server 200.

As illustrated in FIG. 25, when the interface unit 18b in the module 100d receives the above response data, the response-data processing unit 19d overwrites the block B11 in each of the disks 11b and 14b in which the readout failure occurs. Thus, the recovery processing is completed.

4.3 Advantages of Third Embodiment

The system according to the third embodiment can achieve advantages similar to the first embodiment. Further, according to the third embodiment, even when readout failures occur in both the module 100c and 100d, desired data can be easily and reliably recovered by making the inter-node redundant structure and the intra-node redundant structures cooperate.

4.4 Variation of Third Embodiment

As explained above, according to the third embodiment, data in the module 100c is first recovered, and data in the module 100d is thereafter recovered. Alternatively, data in the module 100d may be first recovered, and data in the module 100c may be thereafter recovered.

5. Recording Mediums Storing Programs

The processing functions of each of the systems according to the first to third embodiments which are explained above can be realized by computers. In this case, a program describing details of processing for realizing the functions which each of the modules constituting the systems according to the first to third embodiments needs to have is provided. When a computer executes the program describing details of processing for realizing the functions which each of the modules constituting the systems according to the first to third embodiments, the processing functions of the module can be realized on the computer.

The program describing the details of the processing can be stored in a computer-readable recording medium which can be read by the computer. The computer-readable recording medium may be a magnetic recording device, an optical disk, an optical magnetic recording medium, a semiconductor memory, or the like. The magnetic recording device may be a hard disk drive (HDD), a flexible disk (FD), a magnetic tape, or the like. The optical disk may be a DVD (Digital Versatile Disk), a DVD-RAM (Random Access Memory), a CD-ROM (Compact Disk Read Only Memory), a CD-R (Recordable)/RW (ReWritable), or the like. The optical magnetic recording medium may be an MO (Magneto-Optical Disk) or the like.

In order to put the program into the market, for example, it is possible to sell a portable recording medium such as a DVD or a CD-ROM in which the program is recorded. Alternatively, it is possible to store the program in a storage device belonging to a server computer, and transfer the program to another computer through a network.

The computer which executes each program according to the embodiments stores the program in a storage device belonging to the computer, where the program is originally recorded in, for example, a portable recording medium, or is initially transferred from the server computer. The computer reads the program from the storage device, and performs processing in accordance with the program. Alternatively, the computer may directly read the program from the portable recording medium for performing processing in accordance with the program. Further alternatively, each computer can sequentially execute processing in accordance with each portion of a program every time the portion of the program is transferred from the server computer.

6. Additional Matters (1) As explained above, according to the embodiments, data for the block in which the readout failure occurs is acquired by using a redundant structure between computers, and the block in which the readout failure occurs is overwritten with the acquired data. Therefore, it is possible to reduce the amount of data which needs processing for data recovery, and therefore increase the reliability of the system.

(2) As explained above, according to the first to third embodiments, data is transmitted on a block-by-block basis. Alternatively, data may be transmitted on a stripe-by-stripe basis. In this case, the failure detection unit 15 may detect occurrence of a readout failure on a stripe-by-stripe basis.

(3) Specifically, each element of the system management program, the system management apparatus, and the system management process according to the embodiments may be replaced with another element having a similar function, and any further element or any further step may be added to the system management program, the system management apparatus, or the system management process according to the embodiments. Further, it is possible to arbitrarily combine two or more of the features of the first to third embodiments explained before.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention have been described in detail, it should be understood that various changes, substitutions and alterations could be made hereto without departing from the spirit and scope of the invention.

What is claimed is:

1. A non-transitory computer-readable medium storing a system management program causing a computer to operate as a system management apparatus that manages a first disk array in which distributed data is stored in blocks each serving as a unit region of data storage, said system management apparatus comprising:
a failure detection unit configured to detect an occurrence of a readout failure in blocks of the first disk array;
a request unit that requests another computer having a second disk array that stores a duplicate of the distributed data stored in the first disk array, to supplement a block of the first disk array in which the occurred readout failure is irrecoverable from data stored in the first disk array;
an overwriting unit that overwrites the block of the distributed data in which the readout failure has occurred with a block received from said another computer, and recovers another failed block of the same distributed data stored in the first disk array in which the readout failure has occurred from the received block and other blocks of the same distributed data stored in the first disk array that have not caused the readout failure and overwrites said another failed block with the recovered block;
a reception unit which receives, from said another computer, a request for supplementation of one of the blocks of data stored in said second disk array in which a readout failure occurs;
a block readout unit which reads out one of the blocks of said distributed data stored in said first disk array corresponding to said request for supplementation when said reception unit receives said request for supplementation; and
a transmission unit which transmits to said another computer said one of the blocks read out by said block readout unit;
wherein, when said request for supplementation is received by said reception unit and a readout failure occurring in the blocks of said distributed data stored in the first disk array is detected by said failure detection unit, said transmission unit transmits to said another computer said one of the blocks read out by said block readout unit, and said request unit requests said another computer to supplement said one of the blocks in which the readout failure irrecoverable by use of only the data stored in said first disk array occurs.

2. The non-transitory computer-readable medium according to claim 1, wherein said failure detection unit performs said operation for detecting a readout failure on a block-by-block basis.

3. The non-transitory computer-readable medium according to claim 1, wherein said failure detection unit performs said operation for detecting a readout failure on a stripe-by-stripe basis.

4. The non-transitory computer-readable medium according to claim 1, wherein said failure detection unit performs said operation for detecting a readout failure on a segment-by-segment basis, and said first disk array has segments associated with portions of a logical volume of the first disk array.

5. The non-transitory computer-readable medium according to claim 1, wherein when said reception unit receives said request for supplementation, said failure detection unit detects said readout failure which occurs in said one of the blocks of said data stored in said second disk array.

6. The non-transitory computer-readable medium according to claim 1, wherein at least one of said first disk array and said second disk array constitutes a mirrored structure in which more than one disk holds identical data.

7. The non-transitory computer-readable medium according to claim 1, wherein:
when said request unit requests said another computer to supplement said one of said blocks of said distributed data stored in said first disk array, the request unit converts a data region in which the one of said blocks of said distributed data stored in said first disk array into a region in a logical volume, and
said another computer identifies one of the blocks of said data stored in said second disk array on the basis of the region in the logical volume.

8. The non-transitory, computer-readable medium according to claim 1, wherein identical data is substantially concurrently written by a server in said first disk array and said second disk array.

9. A computer system comprising:
a first disk array that redundantly stores distributed data distributed into blocks so as to recover a failed block of distributed data from other blocks of the same distributed data;
a detection unit that detects a block in the first disk array in which a readout failure has occurred;
a request unit that requests, when a detected readout failure goes beyond a redundancy of the first disk array, another computer comprising a second disk array that stores a duplicate of the distributed data stored in the first disk array to send a block that is stored in said second disk array and corresponds to the failed block;
an overwriting unit that overwrites the failed block with a block received from said another computer;
a reception unit which receives, from said another computer, a request for supplementation of one of the blocks of data stored in said second disk array in which a readout failure occurs;
a block readout unit which reads out one of the blocks of said distributed data stored in said first disk array corresponding to said request for supplementation when said reception unit receives said request for supplementation; and
a transmission unit which transmits to said another computer said one of the blocks read out by said block readout unit;
wherein, when said request for supplementation is received by said reception unit and a readout failure occurring in the blocks of said distributed data stored in the first disk array is detected by said failure detection unit, said transmission unit transmits to said another computer said one of the blocks read out by said block readout unit, and said request unit requests said another computer to supplement said one of the blocks in which the readout failure irrecoverable by use of only the data stored in said first disk array occurs.

10. A system management method for recovering a first disk array that redundantly stores distributed data distributed into blocks from a readout failure, the method comprising:
performing a failure detecting operation for detecting a readout failure occurring in any of the blocks in the first disk array storing the distributed data;
requesting another computer including a second disk array that stores a duplicate of the distributed data stored in the first disk array to supplement a block of the first disk array in which a readout failure irrecoverable from other blocks of the same distributed data stored in the first disk array has occurred;
receiving a block corresponding to a failed block, among the failed blocks stored in the first disk array, from said another computer;
overwriting the failed block with the received block;
recovering another failed block from the received block and other blocks of the same distributed data that have not failed;
overwriting said another failed block with the recovered block;
receiving, from said another computer, a request for supplementation of one of the blocks of data stored in said second disk array in which a readout failure occurs;
reading out one of the blocks of said distributed data stored in said first disk array corresponding to said request for supplementation; and
transmitting to said another computer said one of the blocks that is read out of said first disk array;
wherein, when said request for supplementation is received and a readout failure occurring in the blocks of said distributed data stored in the first disk array is detected, the method requests said another computer to supplement said one of the blocks in which the readout failure irrecoverable by use of only the data stored in said first disk array occurs, in addition to said transmitting of said one of the blocks read out of the first disk array to said another computer.

11. The computer system according to claim 9, wherein:
the readout failure that goes beyond the redundancy of the first disk array is a failure in which blocks of the same distributed data have failed;
the request unit requests said another computer to send a block among blocks corresponding to the failed blocks stored in the first disk array; and
when receiving the block corresponding to the failed block from said another computer, the overwrite unit further recovers another failed block different from the failed block corresponding to the received block, from other blocks stored in the first disk array that have not failed and the received block and overwrites said another failed block with the recovered block.

* * * * *